(12) United States Patent
Wang et al.

(10) Patent No.: US 12,516,248 B2
(45) Date of Patent: Jan. 6, 2026

(54) INTEGRATED CONTINUOUS CONVERSION AND SEPARATION METHODS FOR UPCYCLING MIXED PLASTIC WASTE TO CLEAN GASOLINE AND DIESEL FUELS AND OTHER PRODUCTS

(71) Applicant: Purdue Research Foundation, West Lafayette, IN (US)

(72) Inventors: Nien-Hwa Linda Wang, West Lafayette, IN (US); Kai Jin, West Lafayette, IN (US); Clayton Gentilcore, West Lafayette, IN (US); Yang Xiao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 174 days.

(21) Appl. No.: 18/004,647

(22) PCT Filed: Jul. 9, 2021

(86) PCT No.: PCT/US2021/041059
§ 371 (c)(1),
(2) Date: Jan. 6, 2023

(87) PCT Pub. No.: WO2022/011241
PCT Pub. Date: Jan. 13, 2022

(65) Prior Publication Data
US 2023/0250343 A1 Aug. 10, 2023

Related U.S. Application Data

(60) Provisional application No. 63/049,914, filed on Jul. 9, 2020.

(51) Int. Cl.
*C10G 1/00* (2006.01)
*B01D 3/14* (2006.01)
(Continued)

(52) U.S. Cl.
CPC ............. *C10G 1/002* (2013.01); *B01D 3/143* (2013.01); *B01D 5/0036* (2013.01); *B01D 5/006* (2013.01);
(Continued)

(58) Field of Classification Search
None
See application file for complete search history.

(56) References Cited

U.S. PATENT DOCUMENTS

2009/0036720 A1 2/2009 Carner
2009/0299109 A1* 12/2009 Gruber ...................... C10L 1/08
44/437
(Continued)

*Primary Examiner* — Tam M Nguyen
(74) *Attorney, Agent, or Firm* — David E. Novak; Brannon Sowers & Cracraft PC

(57) ABSTRACT

A method of producing useful fuel fluids from solid plastic waste, including loading solid plastic waste matter into a reaction chamber to define a load, subjecting the load to HTP to extract hydrocarbon mixtures, filtering the hydrocarbon mixtures to extract solid matter, and separating the hydrocarbon mixtures into a light fraction ($C_1$ to $C_{25}$) and a heavy fraction ($C_{26}$ to $C_{31}$). The heavy fraction is directed to a first container and the light fraction is directed to a second container. The light fraction is separated into diesel ($C_8$-$C_{25}$), gasoline ($C_4$-$C_{12}$), and vapor ($C_1$-$C_5$), and the diesel is directed to a third container, the gasoline is directed to a fourth container, and the vapor is directed to a fifth container. The hydrocarbon mixtures have a carbon number distribution between $C_1$ and $C_{31}$. The pressure in the reaction chamber is typically between 0.1 and 10 MPa and the temperature in the reaction chamber is between 350 and 500 degrees Celsius. The plastic waste is selected from the group consisting of PS, PE, PP, and mixtures thereof.

15 Claims, 30 Drawing Sheets

(51) Int. Cl.
*B01D 5/00* (2006.01)
*C10B 53/07* (2006.01)
(52) U.S. Cl.
CPC ...... *C10B 53/07* (2013.01); *C10G 2300/1003* (2013.01); *C10G 2300/4006* (2013.01); *C10G 2300/4012* (2013.01); *C10G 2400/02* (2013.01); *C10G 2400/04* (2013.01); *C10G 2400/08* (2013.01); *C10G 2400/10* (2013.01)

(56) References Cited

U.S. PATENT DOCUMENTS

| | | | |
|---|---|---|---|
| 2016/0045841 A1* | 2/2016 | Kaplan | C01B 32/05 |
| | | | 429/49 |
| 2018/0155642 A1* | 6/2018 | Al-Ghamdi | C10G 69/08 |
| 2018/0305274 A1* | 10/2018 | Rafique | B01J 23/75 |
| 2019/0040329 A1* | 2/2019 | Moore | C10G 69/04 |
| 2019/0322832 A1 | 10/2019 | Chen et al. | |
| 2020/0071619 A1 | 3/2020 | Humphreys et al. | |
| 2021/0079305 A1* | 3/2021 | Al-Ghamdi | C10L 1/08 |
| 2021/0246381 A1* | 8/2021 | Koseoglu | B01J 19/245 |
| 2021/0246389 A1* | 8/2021 | Koseoglu | B01D 3/10 |

* cited by examiner

… …

INTEGRATED CONTINUOUS CONVERSION AND SEPARATION METHODS FOR UPCYCLING MIXED PLASTIC WASTE TO CLEAN GASOLINE AND DIESEL FUELS AND OTHER PRODUCTS

CROSS-REFERENCE TO RELATED APPLICATIONS

This patent application claims priority to U.S. Provisional Patent Application Ser. No. 63/049,914, filed on Jul. 9, 2020.

FIELD OF THE INVENTION

The present novel disclosure relates generally to the field of chemistry, and, more particularly to methods and devices for efficiently reclaiming fuel oils from plastic waste.

BACKGROUND

The amount of plastic waste has grown exponentially over the past 60 years. Only about 9% of the total waste has been recycled and 12% has been incinerated, FIG. 1. The rest, about 6 billion tons, has accumulated as waste in landfills or oceans, where the waste degrades slowly, over decades or centuries, into microplastics, releasing toxic chemicals into the environment. The state-of-the-art separation technologies for removing microplastics and toxic chemicals from water cost about $0.003 per gallon. Since the oceans have $3.5 \times 10^{20}$ gallons of water, removing plastic waste, microplastics, and their degradation products from the oceans would cost about $10^{18}$, or 10,000 times the global GDP. This plastic pollution is a more urgent threat to life on land or below water than climate change.

Conventional methods, including incineration, mechanical recycling, and pyrolysis, are ineffective for reducing the plastic waste amounts. Incineration releases greenhouse gases and toxic gases, has low energy recovery, and requires tipping fees ($15-20/ton) to offset the processing costs. Mechanical recycling of mixed plastic waste typically results in dark-colored, lower-value products, which have limited uses. After a few cycles, polymer properties degrade, and the wastes must be landfilled or incinerated. Pyrolysis can convert mixed plastic waste to oil, but it has a relatively low yield without the use of catalysts. Fast pyrolysis also generates significant amounts of polycyclic aromatic hydrocarbons (PAH) and char, which causes catalyst fouling and deactivation, and high maintenance costs. The oils need to be transported to refineries for extensive upgrading and separation to produce transportation fuels or other products, requiring high maintenance costs. For these reasons, only 2% of the plastic wastes in the US are currently remade into products for originally intended applications; 98% of new plastic products are made from virgin feedstocks. About 80% of the total amount of plastics produced to date have accumulated as waste in the environment.

Globally, more than 220 million tons of polyolefin (PE and PP) waste have been generated annually since 2010. Polyolefins have a very short in-use lifetime (<6 months) and less than 8% of the polyolefin waste is collected by curbside recycling and sent to MRFs. Among the collected polyolefin waste, about one-third of the rigid HDPE bottles and jars are currently recycled, or made into construction materials. Almost all polyolefin films, which are about one-fifth of the polyolefin waste, are currently landfilled or incinerated. Only 14% of the 78 million tons of polyolefin packaging materials produced annually are collected. Globally, about 24 million tons of polystyrene (PS) waste are produced annually. Only 0.9% of the PS wastes in the U.S. were recycled in 2018. These three types of wastes, PE, PP, and PS, have high energy contents and are promising feedstocks for producing liquid transportation fuels and other useful products that have yet to be tapped. Thus, there remains a need for more efficient and environmentally friendly methods for recovery of energy and materials form plastic waste. The present novel technology addresses this need.

SUMMARY

Integrated Conversion and Separation methods (ITCS), consisting of hydrothermal processing followed by separation, have been invented for producing gasoline and diesel fuels and other useful products. The methods eliminate the need for costly upgrading processes for producing fuels, require no catalysts, and produce little polyaromatic hydrocarbons or char (<1%). Under preferred conversion conditions, 13 wt % of polyolefins are converted to gases (mainly $C_3$) and 87 wt % are converted to oils with carbon number distributions in the gasoline and diesel range ($C_4$ to $C_{25}$). The oils are separated with on-line distillation or multi-stage condensation into gasoline and diesel products. The energies from combustion of the gases (5.7 MJ/(kg plastic)) are larger than those required for the entire ITCS processes, including feedstock pretreatment (<0.7 MJ/(kg plastic)), depolymerization (1.5 MJ/(kg plastic), separation with distillation (1.2 MJ/(kg oil) or separation with multistage condensation (0.4 MJ/(kg oil). The ITCS methods are much more energy efficient and environmentally friendly than the conventional methods for producing gasoline or diesel fuels from crude oil, which consume 44 MJ energy and result in 0.8 kg $CO_2$ emissions per kg fuels produced (FIG. 2). Since ITCS needs no energy input for oil drilling and long-distance transportation of crude oil to refineries for cracking and upgrading, the GHG emissions from burning the gases, 0.3 kg $CO_2$/kg fuels, are 60% lower than for producing the fuels from crude oil. ITCS also has lower capital, operating, and overall production costs than producing the fuels from crude oil (FIG. 2).

If widely adopted, the ITCS methods can produce annually up to 1.5 billion barrels of gasoline and diesel fuels (or 4% of global annual fuel demand) from polyolefins and 0.14 billion barrels of fuels or fuel additives from PS. ITCS can save up to 1.5 billion barrels of oil energy equivalents (BOE) and reduce GHG emissions by 100 million tons of $CO_2$ per year, compared to producing the same amount of fuels from crude oil. ITCS can also provide financial incentives for consumers and industry to increase plastic waste collection and reduce waste accumulation and plastic pollution. ITCS has the potential to transform the current linear path from crude oils to plastic products and to wastes into a more economical and sustainable circular path by producing clean fuels and other products (FIG. 1).

Results show that low-pressure hydrothermal processing (LP-HTP) of mixed polyolefin waste at 450° C. and a much lower pressure, 1.0 MPa, produced oils with similar yields (87 wt %) and similar compositions as those from HTP at 450° C. and 23 MPa. Pyrolysis at 450° C. and 1 atm (0.1 MPa) for 45 min, in the presence of nitrogen with no catalyst or steam was also tested for comparison. The oil composition was similar to HTP oils produced at 450° C., 45 min, and 23 MPa. The pyrolysis oil yield, however, was lower, ~85 wt %, and small amounts of char (~1 wt %) and PAH (0.5 wt %) were produced. The results indicate that LP-HTP at a lower pressure, between 0.1 MPa and 10 MPa, than that for HTP (>22 MPa) produces high-quality oils with high yields and with little char or PAH and without the need for catalysts. The results show that this LP-HTP method is effective for converting polyolefin and PS wastes or mixtures of PE, PP, and PS into hydrocarbon mixtures with a carbon number distribution in the $C_1$ to $C_{31}$ range. The liquid in the $C_4$ to $C_{25}$ range can be separated into gasoline and diesel fuels. The hydrocarbons also have potentials to be used as other products such as jet fuels, waxes, lubricants, naphtha, heavy oils, and feedstocks for producing other chemicals.

Understanding of the reaction kinetics of HTP enabled the production of oils with the carbon number distribution from $C_4$ to $C_{25}$, which matches the carbon number ranges of gasoline ($C_4$-$C_{12}$) and diesel ($C_8$-$C_{25}$). Distillation can be used to continuously separate these oils into a gasoline product and a diesel product. Alternatively, the oils can be separated into fuels with a multi-stage condensation system. This simpler multi-stage condensation setup utilizes the boiling points of key components in the hydrocarbon mixtures to determine the optimal separation temperatures that maximize the separation efficiency of the gasoline and diesel products.

ITCS is a continuous process which is more productive and energy-efficient by avoiding the periods of startup and shutdown in batch processes. The energy efficiency is further improved as the energy input for conversion is also utilized for separation. Furthermore, the energies from the combustion of the gases are larger than the total energy required for the entire ITCS process. As seen below in Examples 1-3, ITCS requires no energy input and can have a surplus up to 2.2 MJ/kg, while 40 MJ/kg energy is needed for producing fuels from crude oil.

The overview of ITCS is shown in FIG. 3. Plastic feed was loaded into a reactor for the conversion into mixed products. The mixed products were then separated into different products via a separation process.

Here, the plastic feed includes polyethylene terephthalate (PET), polyethylene (PE), polyvinyl chloride (PVC), polypropylene (PP), polystyrene (PS), other types of plastic such as polycarbonate (PC), and polyamides, and their mixtures at various ratios. The preferred feed includes polyethylene (PE), polypropylene (PP), polystyrene (PS), and combinations of these plastic feedstocks at various ratios.

The conversion process includes hydrothermal processing (HTP) or pyrolysis. The reactor for conversion includes setups such as a fixed bed reactor or a fluidized reactor. The conditions for the conversion process include reaction temperatures between 200° C. to 600° C., preferred between 350° C. to 500° C., reaction pressures between 0.1 to 23 MPa, preferred between 0.1 to 10 MPa, reaction time between 0 to 6 h, preferred between 0.5 to 4 h, and water-to-plastic feed weight ratio (only for HTP) between 0:1 to 2:1, preferred between 0:1 to 0.5:1.

The separation process includes multi-stage condensation or distillation. The separator for the separation process includes condensers and distillation columns. The conditions for the separation process include 75° C. to 200° C. for separating gasoline from diesel, 200° C. to 350° C. for separating diesel from heavy oil, and appropriate temperatures between 20° C. to 500° C. for separating other products.

The separation products include gasoline, diesel, light hydrocarbon gases, and other products, which may include jet fuels, waxes, naphtha, lubricants, heavy oils, chemical feedstocks (toluene, xylene, styrene, and other hydrocarbon chemicals) and the like. Light hydrocarbon gases that are recovered may be collected and combusted for energizing the ITCS to render it self-sustaining and/or can be used as products as well.

DETAILED DESCRIPTION

Before the present methods, implementations, and systems are disclosed and described, it is to be understood that this invention is not limited to specific methods, specific components, implementation, or to particular compositions, and as such may, of course, vary. It is also to be understood that the terminology used herein is for the purpose of describing particular implementations only and is not intended to be limiting. Neither are explanations that have been provided to assist in understanding the disclosure meant to be limiting.

Figure 1:
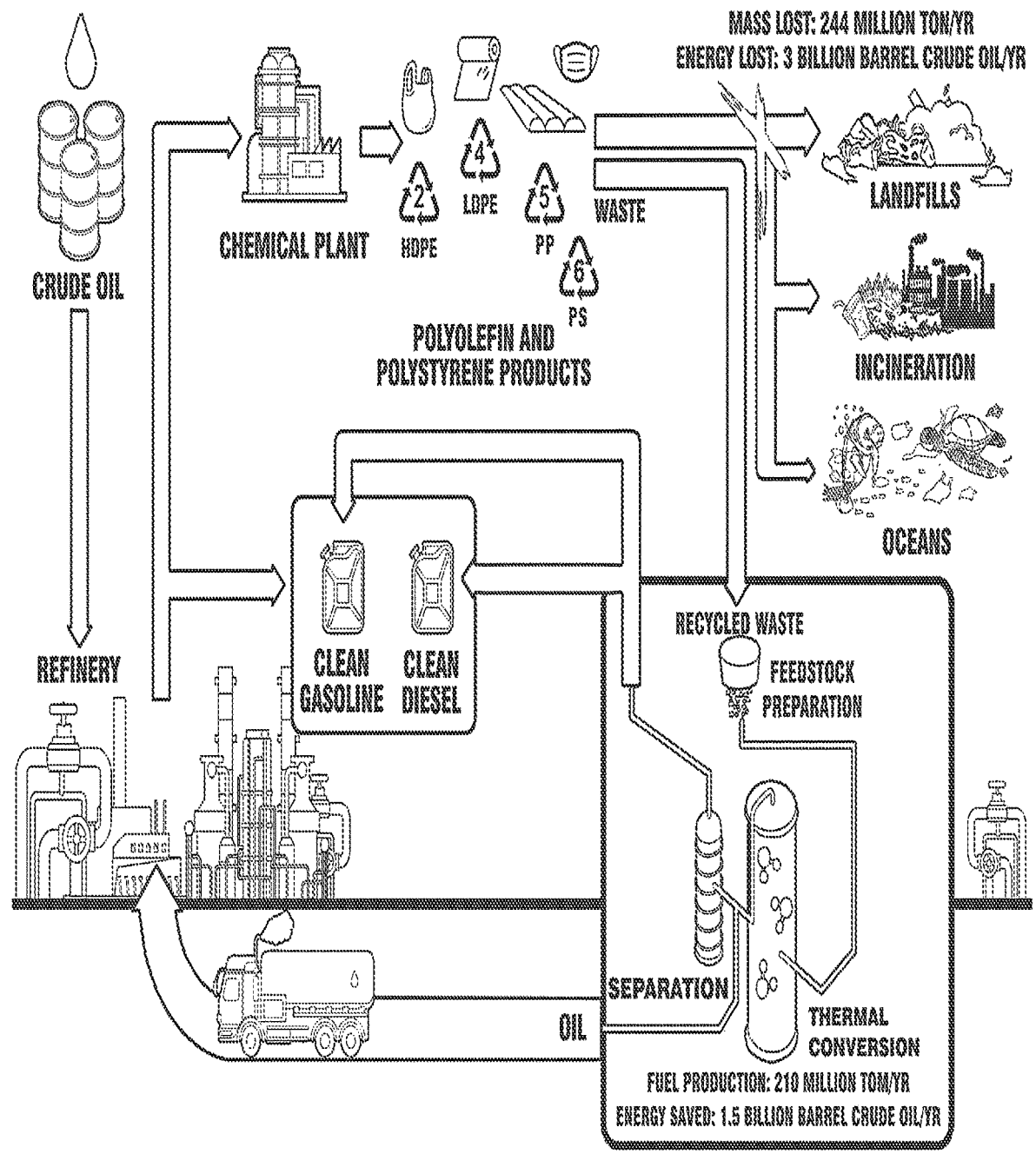
FIG. 1 graphically illustrates integrated thermal conversion and separation method for producing gasoline and diesel fuels from polyolefin and polystyrene waste.
Figure 2A:
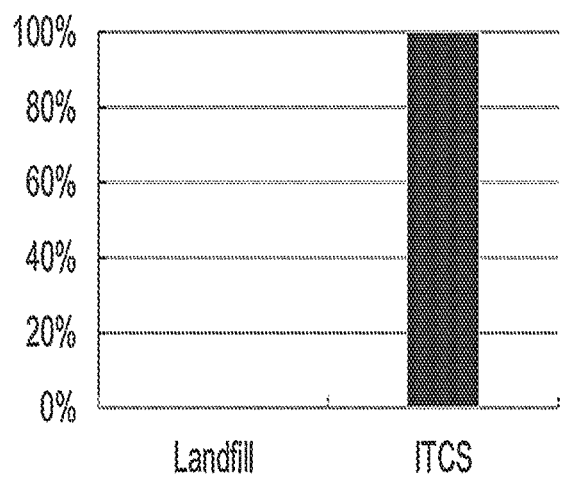
FIGS. 2A-D show the comparison of ITCS with conventional methods: (a) material efficiency, (b) energy demand, (c) GHG emissions, and (d) production costs.
Figure 2B:
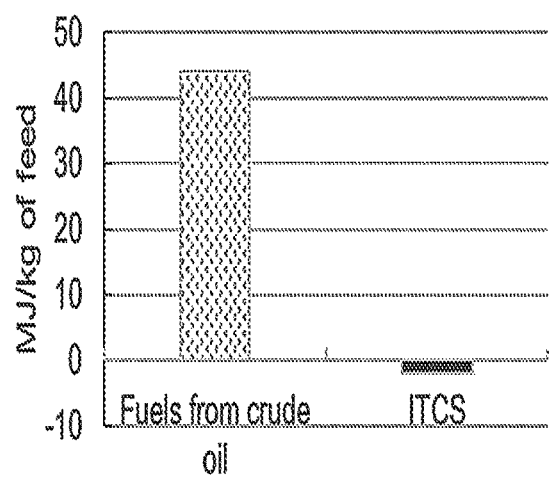
Figure 2C:
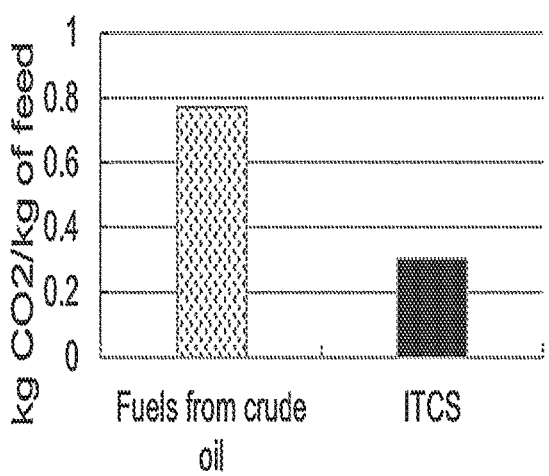
Figure 2D:
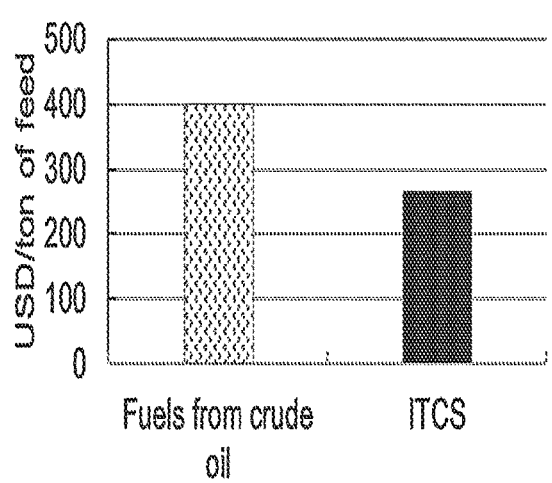
Figure 3:
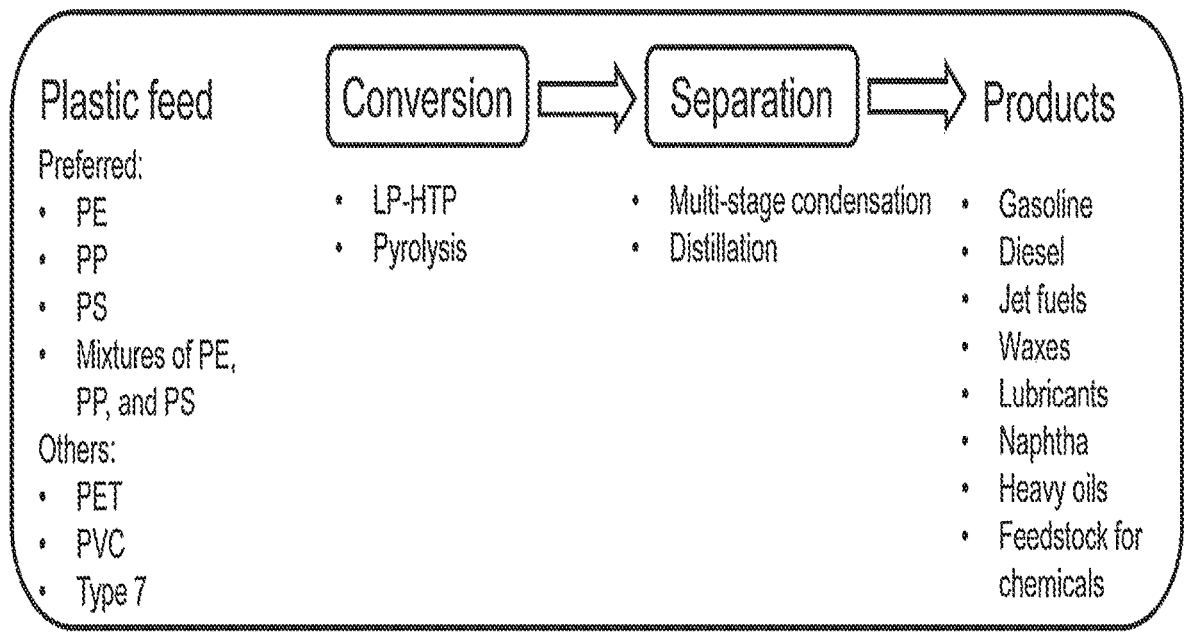
FIG. 3 is the graphical overview of the ITCS process block diagram.
Figure 4:
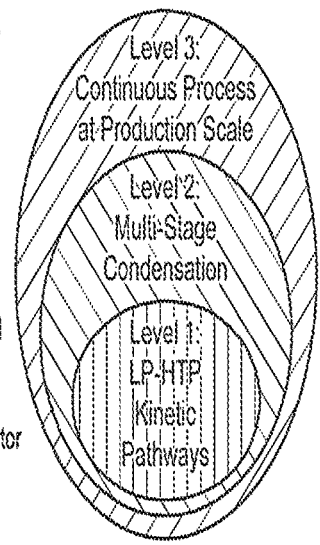
FIG. 4 graphically illustrates the three-level model for ITCS.

A three-level model was used in the development of ITCS, as shown in FIG. 4. The model at Level 1 focuses on the HTP conversion process, considering the reaction pathways and kinetic models of depolymerization. Parameters such as reaction temperature, pressure, time, and water-to-plastic ratio are optimized to improve the product yields, qualities, process energy efficiencies, and process productivities. The model at Level 2 focuses on the separation process, distillation and multi-stage condensation. Parameters such as flow rates and separation temperatures of compounds of interest are considered to improve the product yields, qualities, process energy efficiencies, and process productivities. The model at Level 3 focuses on the integration of the conversion and separation processes, in a continuous production-scale process. Equipment sizing, feedstock flow rates, and product flow rates are considered to minimize the capital and operating costs, and to improve the efficiency and profitability of ITCS.

Figure 5:
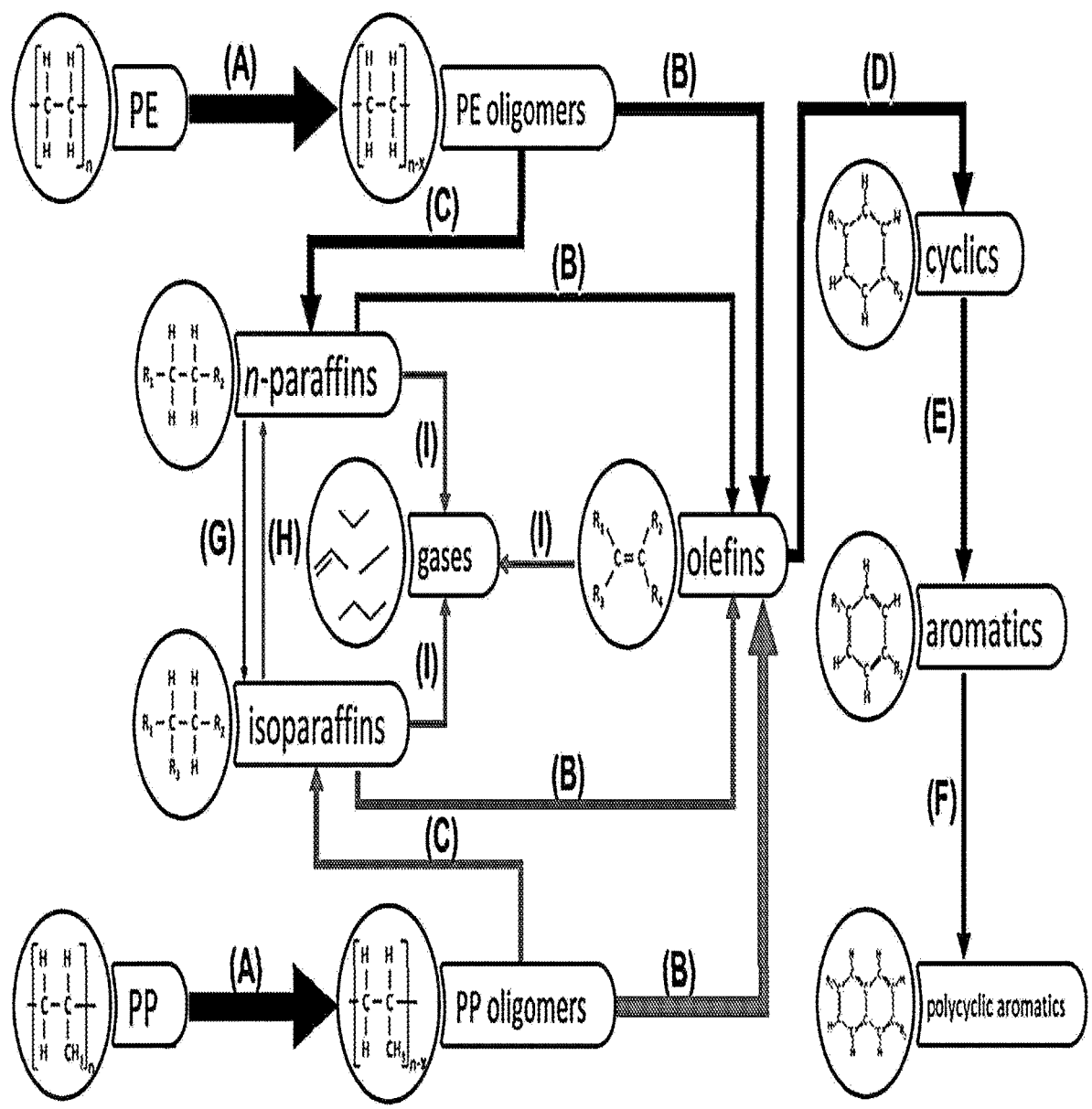
FIG. 5 shows the reaction pathways of PE and PP under HTP, including (A) depolymerization, (B) B-scission, (C) hydrogen abstraction, (D) cyclization, (E) dehydrogenation, (F) formation of polycyclic aromatic hydrocarbon, (G) isomerization, (H) formation of short n-paraffins ($C_6$-$C_7$), and (I) further cracking to gases.

The thermal conversion pathways of PP and PE in HTP are shown in FIG. 5. Since the C—C bonds in the polymer chain have a lower energy (348 KJ/mol) than the C—H bonds (413 KJ/mol), the depolymerization of PE and PP is initiated primarily by breaking the C—C-bonds to start forming oligomers (Reaction A). The PE oligomers are further converted into olefins and n-paraffins via B-scission (Reaction B) and hydrogen abstraction (Reaction C), respectively. For PP oligomers, the reactions can occur in two ways, by breaking the C—C bonds of the main chain and by breaking the C—CH$_3$ bonds (335 KJ/mol) of the branches. Breaking the C—C bonds, followed by β-scission (Reaction B) or hydrogen abstraction (Reaction C), generates olefins and isoparaffins, respectively. Breaking the C—CH$_3$ bonds followed by β-scission (Reaction B) generates only olefins. Since the C—CH$_3$ bonds have a lower bond energy than the C—C bonds, Reaction B is more favored. For this reason, PP depolymerization generates more olefins than isoparaffins.

For both PE and PP, the olefins are converted into cycloparaffins via cyclization (Reaction D), which are further dehydrogenated into single-ring aromatics (Reaction E), and then polycyclic aromatics (Reaction F). Some minor char formation may be observed, caused apparently by further dehydrogenation of polycyclic aromatics. A small fraction of n-paraffins from PE depolymerization is converted into isoparaffins via isomerization (Reaction G). Similarly, in PP depolymerization, a small fraction of short n-paraffins ($C_6$-$C_7$) is produced from the isoparaffins (Reaction H). Gases are generated from further cracking of short n-paraffins, isoparaffins, and olefins (Reaction I).

More than 150 compounds were identified using two-dimensional GC×GC-FID and were lumped into ca. 30 carbon numbers and eight major hydrocarbon groups, including waxes, n-paraffins, olefins, cycloparaffins, aromatics, polyaromatics, and gases. The pathways assisted in the identification of optimal conditions for producing target products, as shown in Examples 1-3 for producing gasoline and diesel. Another example is that at the temperature of 425° C. and the reaction times of 30-40 min, a PE waste (mixture of HDPE and LDPE) was converted into a wax product with a yield of 97 wt %. The wax consists of 80 wt % n-paraffins and 20 wt % α-olefins, based on GC×GC-TOF/MS analysis.

Figure 6A:
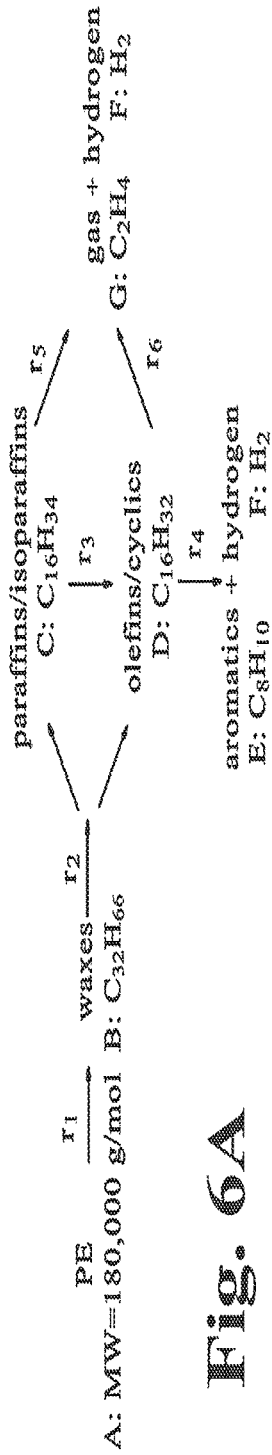
FIG. 6A graphically illustrates a simplified kinetic model of depolymerization process in HTP.
Figure 6B:
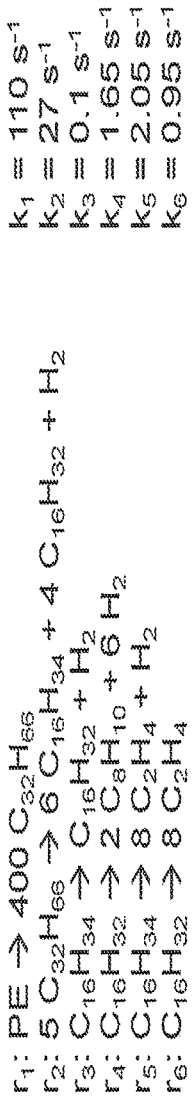
FIG. 6B graphically illustrates reactions for thermal conversion of PE waste plastics.
Figure 6C:
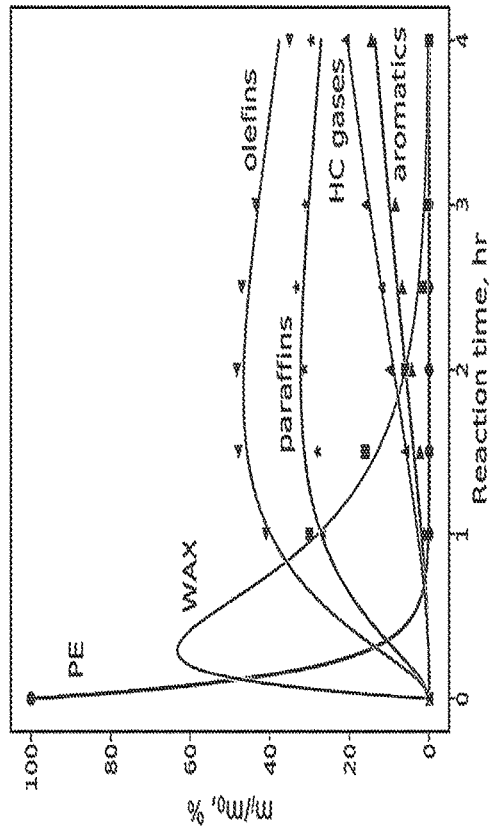
FIG. 6C graphically illustrates kinetic parameter regression for thermal conversion of PE waste plastics.

A simplified kinetic model was developed to describe the depolymerization process in HTP (FIG. 6A). Seven lumped species (PE, wax, paraffins, olefins, aromatics, light hydrocarbon gases, and hydrogen) were considered in six representative reactions ($r_1$-$r_6$ in FIG. 6B. First-order reactions were assumed for the six reactions with no mass or heat transfer effects. We obtained best estimates of reaction rate constants ($k_1$-$k_6$) based on the mathematical interpretation of the experimental data. This simple model successfully described the kinetic data, the yields of all products as a function of reaction time (FIG. 6C). A similar kinetic model for PP conversion was also developed (not shown).

Figure 7A:
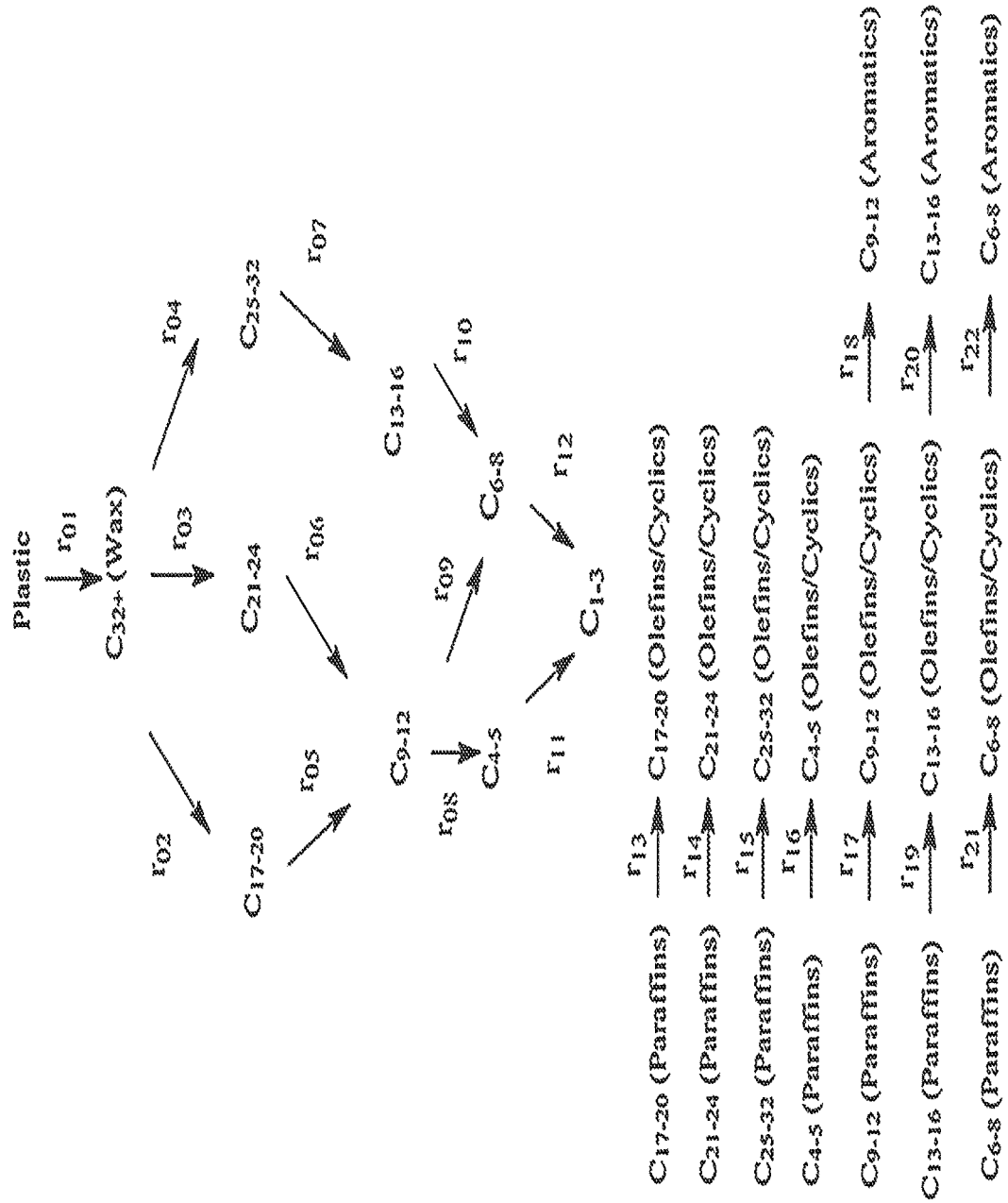
FIG. 7A graphically illustrates a more detailed reaction network.

A more detailed reaction network was also being developed to model the carbon-number distribution of the products from the conversion of waste plastic to fuels, FIG. 7A. Here, 22 reactions ($r_1$-$r_{22}$) and 20 species are included. The species in the upper part ($r_1$-$r_{12}$) of FIG. 7A refer to paraffins/isoparaffins, while their further conversion to olefins/cyclo-paraffins and then aromatics are shown in the lower part ($r_{13}$-$r_{22}$).

Figure 7B:
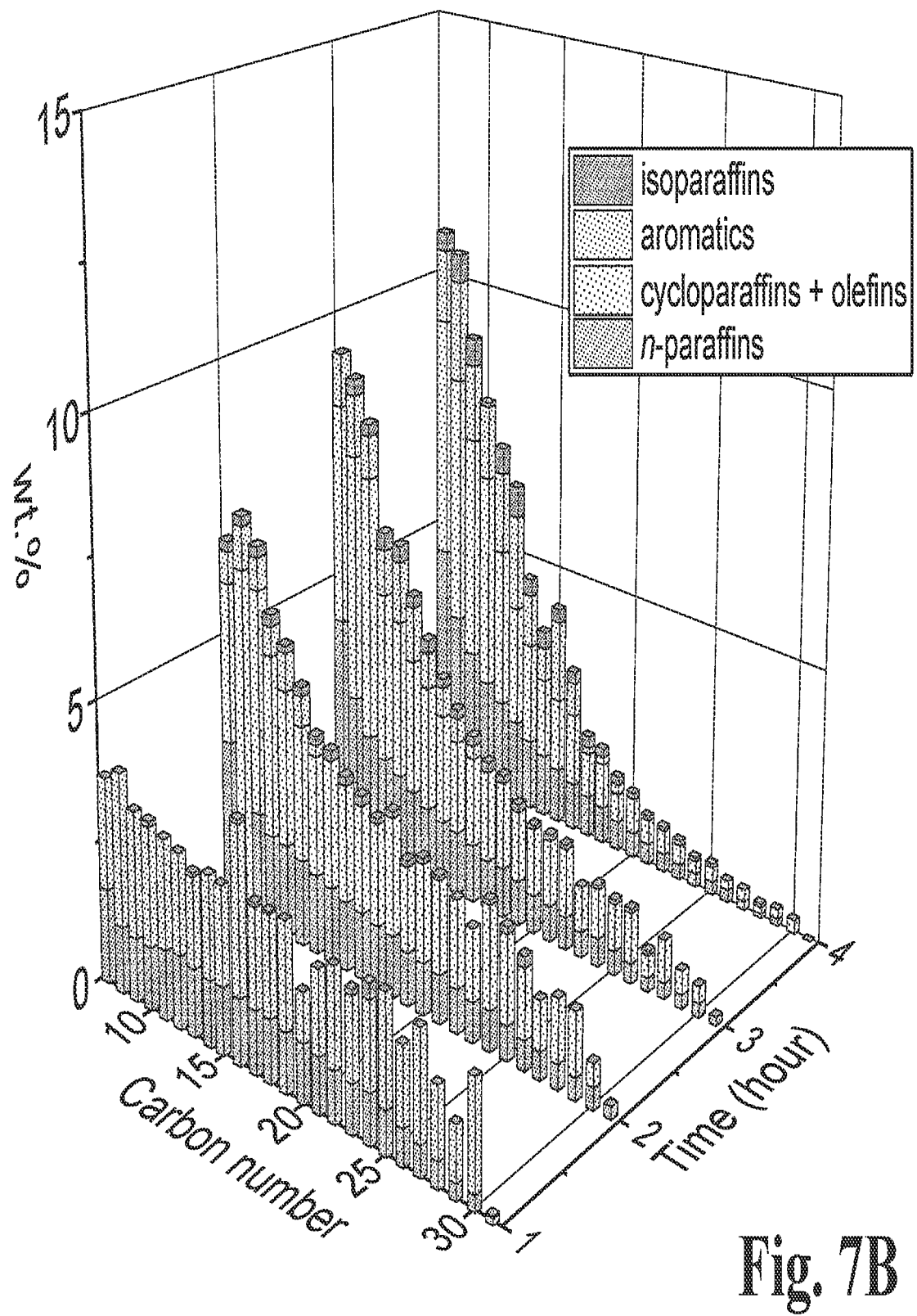
FIG. 7B-C graphically illustrate a comparison between modeling and experimental data.
Figure 7C:
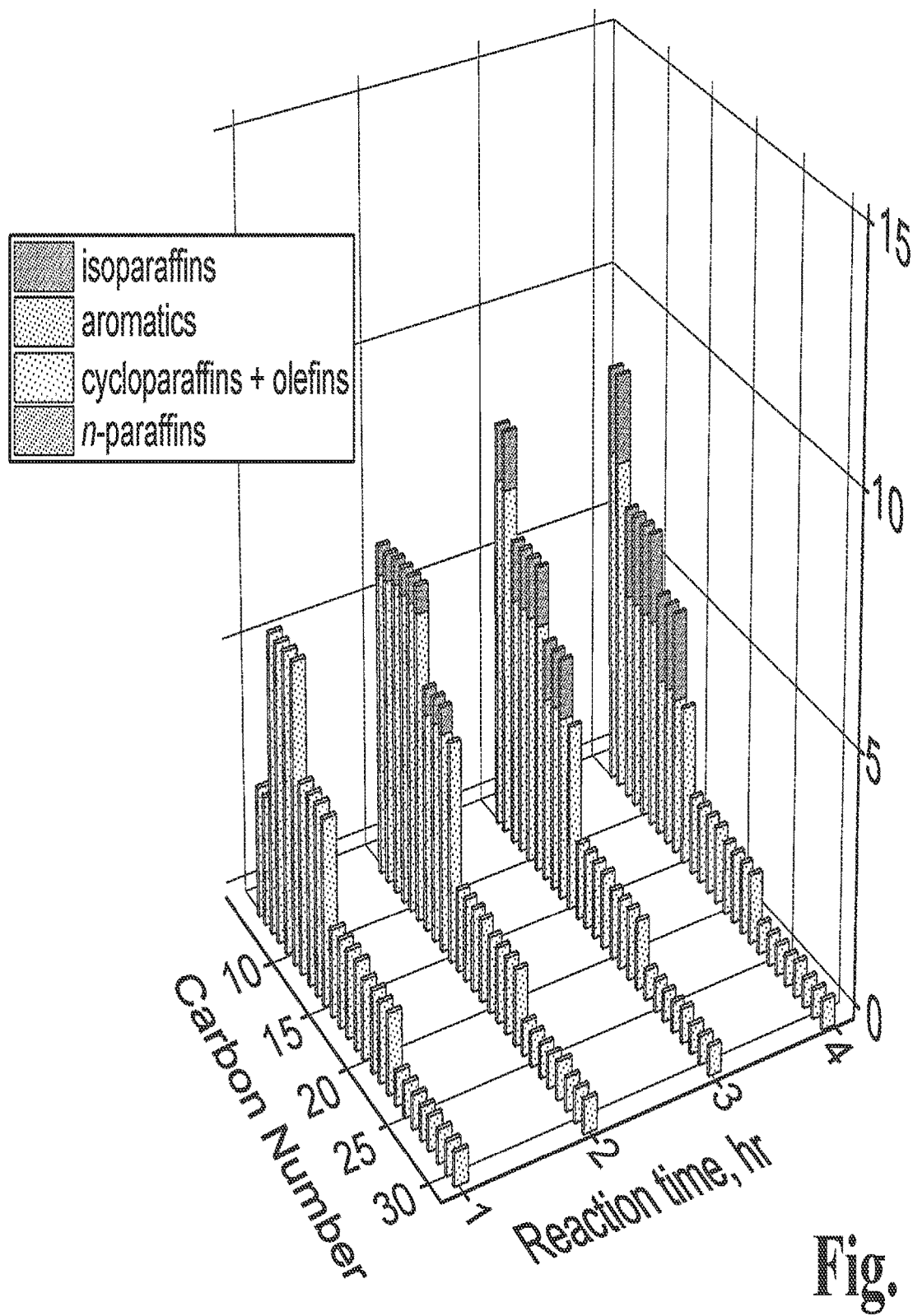

Preliminary simulation results are compared with experimental data in FIGS. 7B-C. This model can be used to predict the trend of carbon-number distribution of products from the conversion of waste plastic to fuels.

Figure 8:
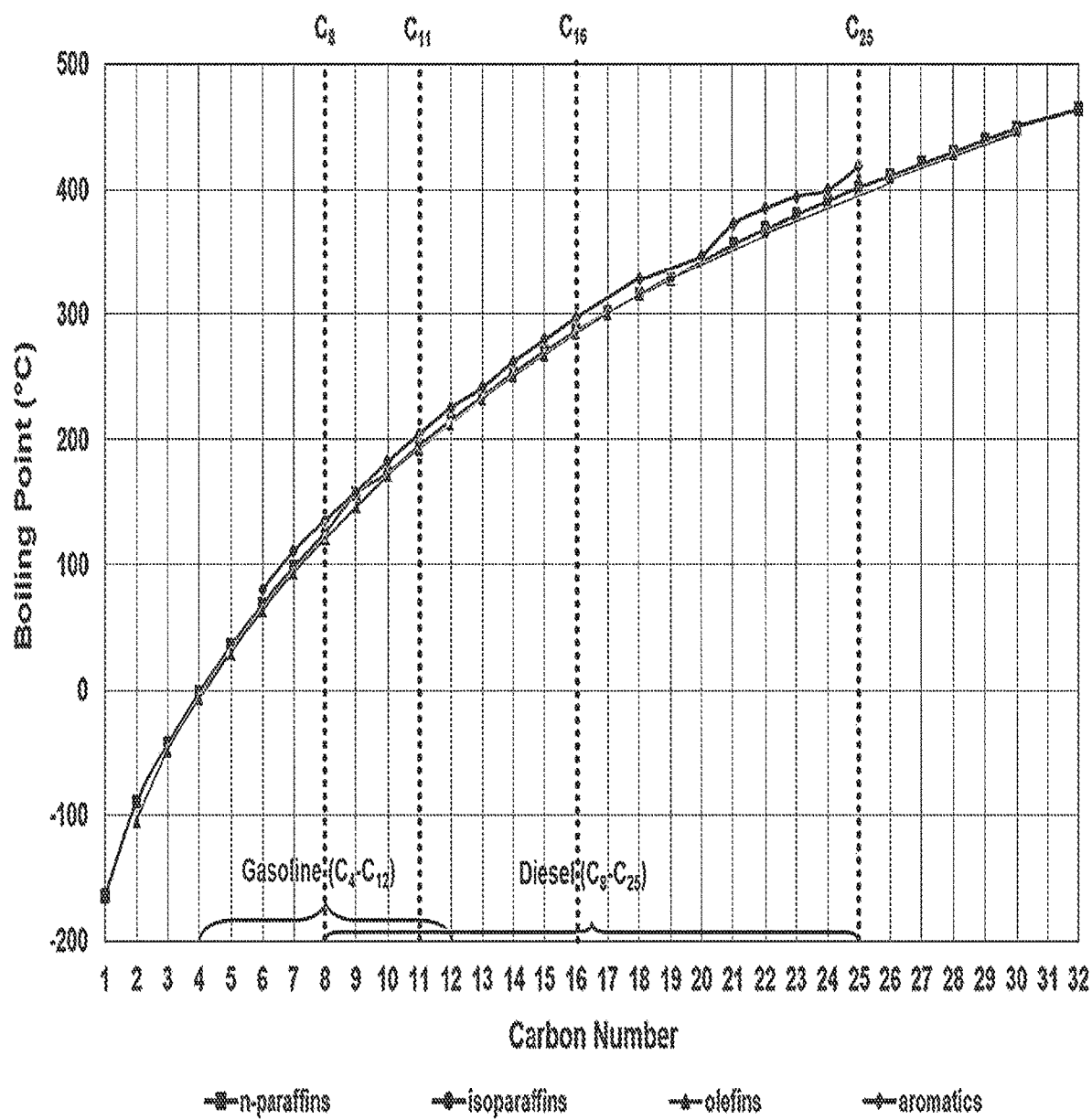
FIG. 8 graphically illustrates boiling points of various hydrocarbon classes with varying carbon numbers and graphically illustrates the selections of the first stage condensation temperature for separating gasoline and diesel fractions from a hydrocarbon mixture of $C_1$-$C_{31}$. Carbon Number Distribution Index (CNDI) is defined as the percentage of hydrocarbons in the desired carbon number range of each product, such as gasoline ($C_4$-$C_{12}$) and diesel ($C_8$-$C_{25}$). For CNDI of 95% or above, the temperature range is between the bubble point of $C_{12}$ and the dew point of $C_8$ in the mixture. For CNDI of 90% or above, the temperature range is between the bubble point of $C_{10}$ and the dew point of $C_{10}$ in the mixture.

When determining what temperatures are required and potentially optimal for the separation of the products, such as gasoline (mostly $C_4$-$C_{12}$) and diesel (mostly $C_8$-$C_{25}$) fractions, through either multi-stage condensation or distillation in ITCS, the boiling point temperatures of various hydrocarbons and their mixtures were analyzed. Specifically for multi-stage condensation, the temperatures of the liquid-vapor separators are maintained at temperatures related to the boiling points of key hydrocarbon components present within the product mixture. The first liquid-vapor separator (LVSEP-1) is designed to recover the diesel fraction. The temperature is based on the bubble points and dew points of $C_8$-$C_{12}$ (FIG. 8). The temperature of the second liquid-vapor separator (LVSEP-G) is based on the bubble points and dew points of $C_4$-$C_5$ (FIG. 8), and is used to separate the gasoline fraction from light hydrocarbon gases (mostly $C_1$-$C_3$).

Figure 9:
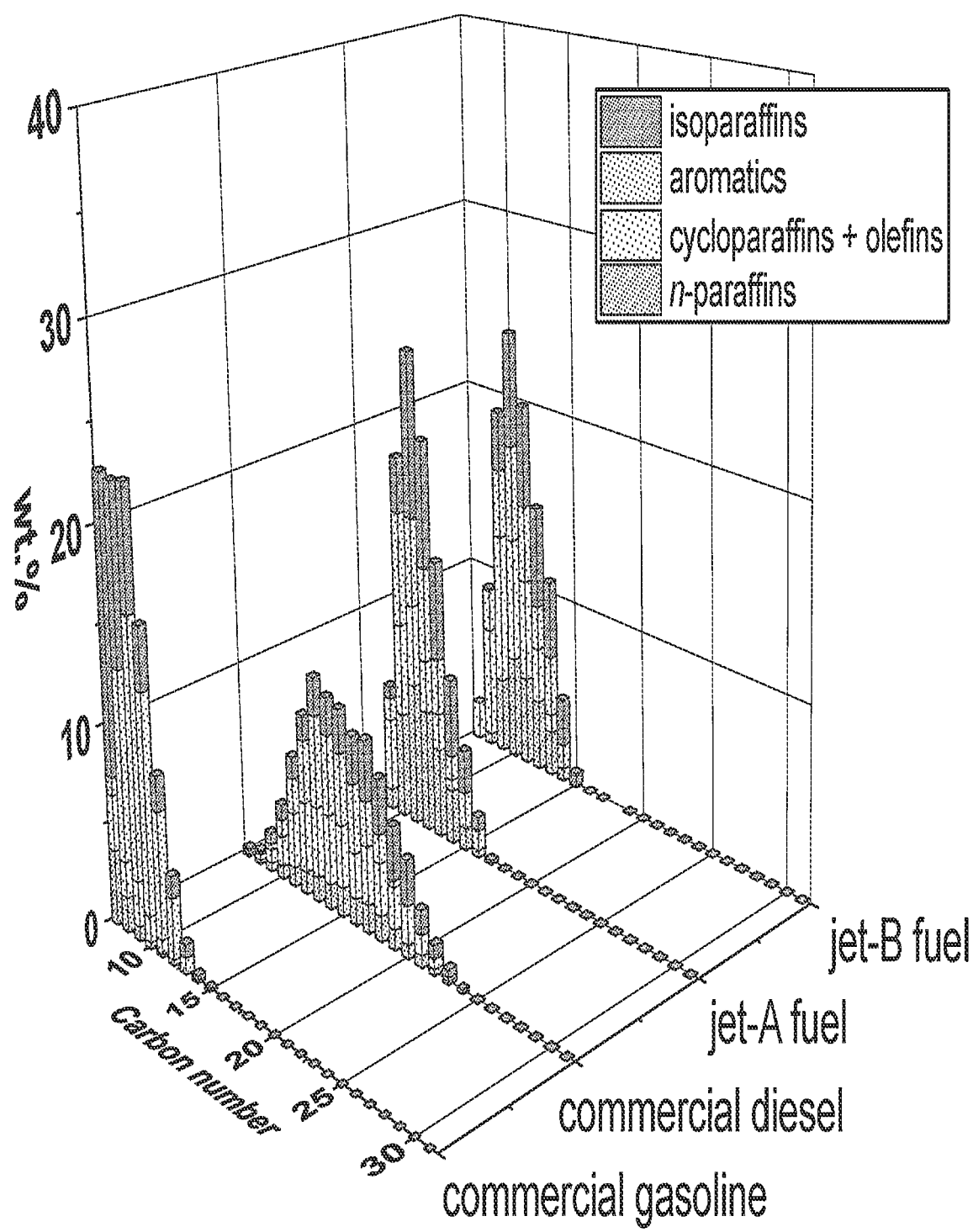
FIG. 9 graphically illustrates chemical compositions of commercial gasoline, diesel, jet Fuel A, and jet Fuel B.

By designing the operation conditions of the separators, the same oil mixture ($C_4$-$C_{25}$) can be separated into Jet-A ($C_8$-$C_{16}$), Jet-B ($C_5$-$C_{15}$), and heavy oils ($C_{17}$-$C_{25}$). For multi-stage condensation, the temperatures of the three liquid-vapor separators are based on the boiling points of $C_8$-$C_9$, $C_7$-$C_8$, and $C_4$-$C_5$, respectively. The chemical compositions of the respective products of gasoline, diesel, Jet-A, and Jet-B are shown in FIG. 9.

EXAMPLES

Example 1: HTP and Multi-Stage Condensation

Figure 10:
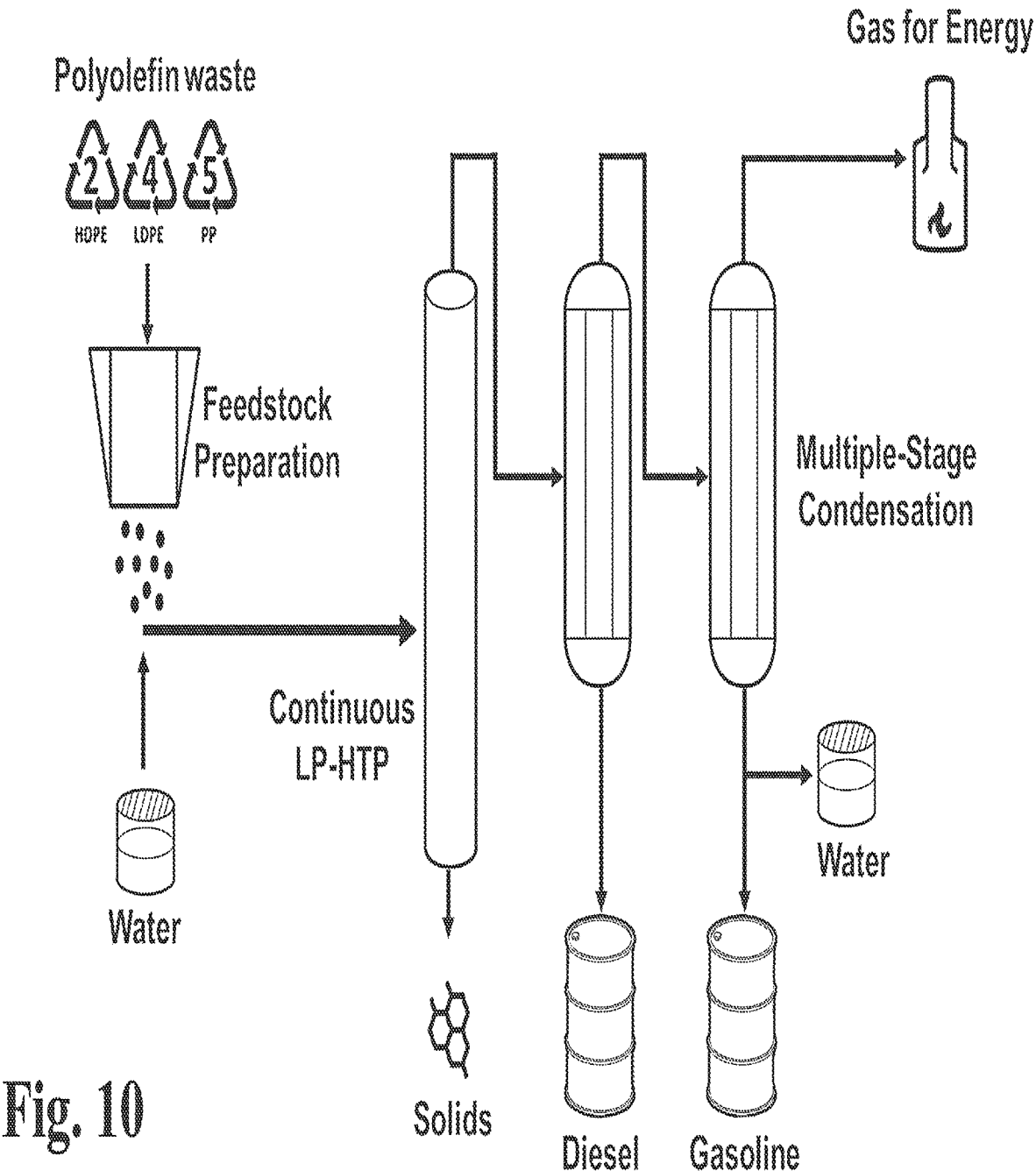
FIG. 10 graphically illustrates a process flow diagram for Example 1 of ITCS, which utilizes hydrothermal processing (HTP) and multi-stage condensation.

An example of ITCS is shown in FIG. 10. Here, plastic waste (PE, PP, PS, or mixtures) was used as the feedstock. The plastic feed was shredded for size reduction and then mixed with water for loading. The conversion process is HTP. The separation process is multi-stage condensation using two condensers for separating diesel and gasoline sequentially. The main products are gasoline and diesel.

Figure 11:
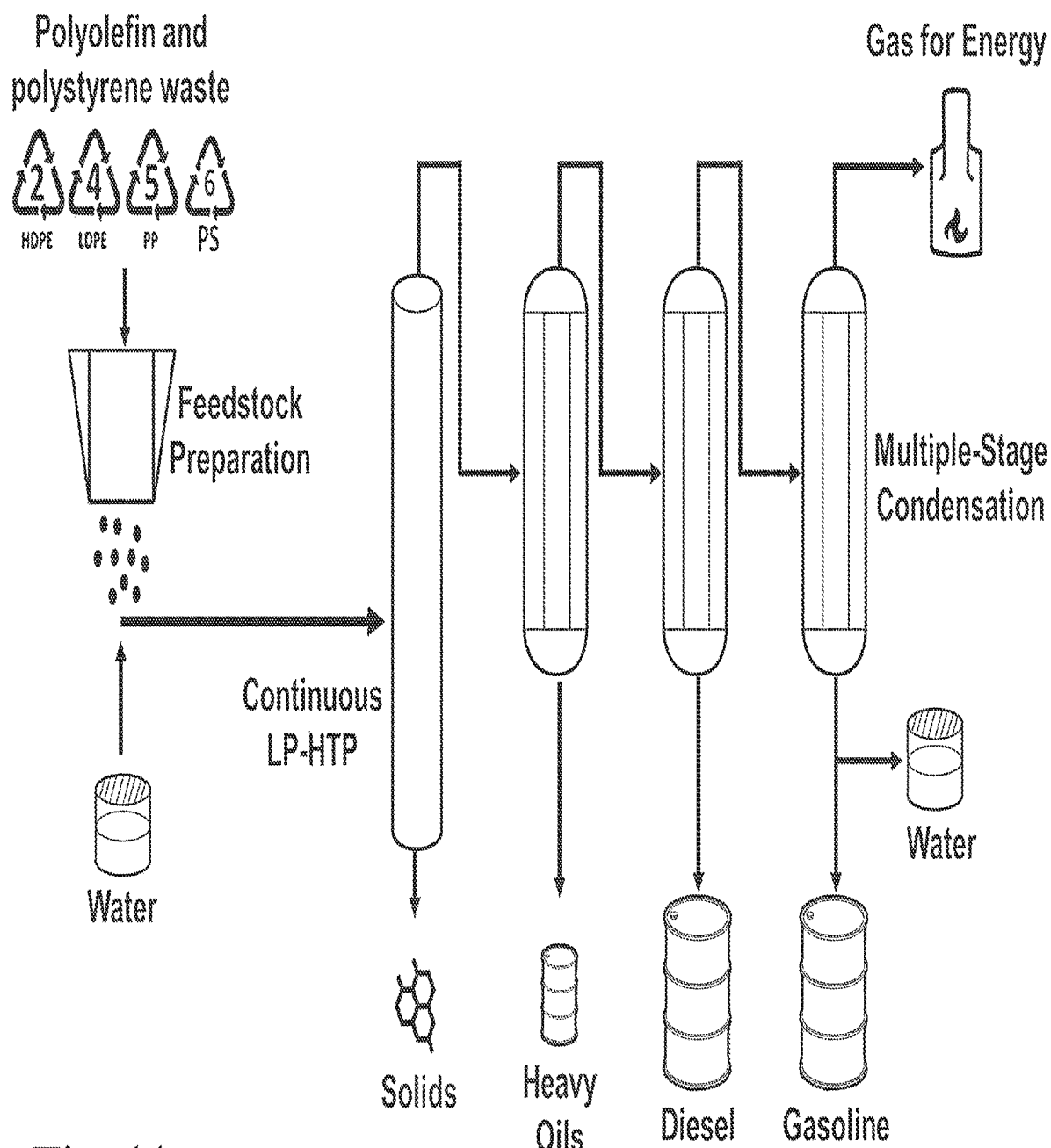
FIG. 11 is a process flow diagram for Example 1 of ITCS when PS is in the plastic feed. An extra condenser was used to separate heavy oils before separating diesel and gasoline.

With cases where PS is in the plastic feed, the products will also contain heavy oils. Therefore, another condenser is used for separating heavy oil before separating diesel and gasoline, as shown in FIG. 11.

Figure 12:
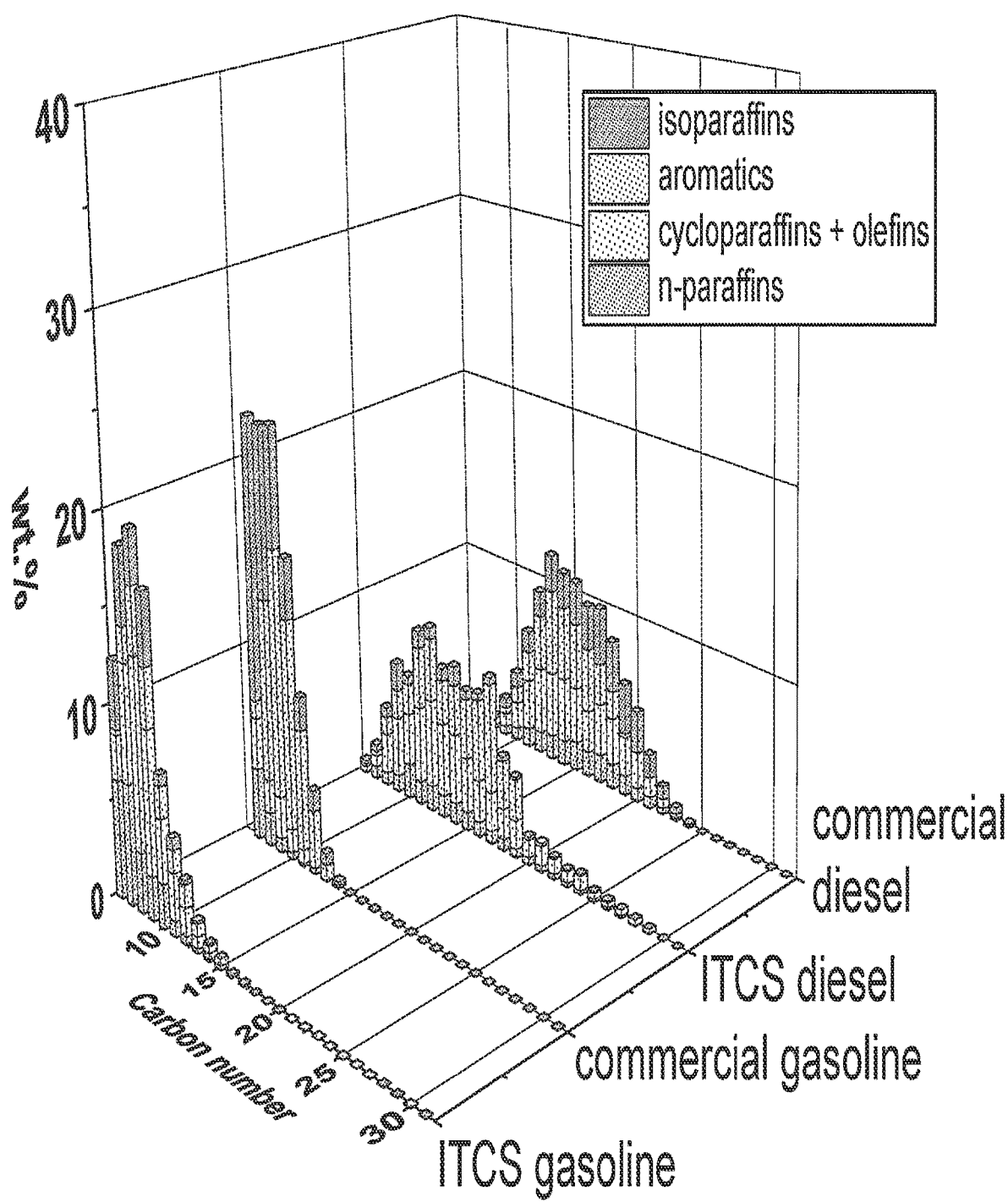
FIG. 12 graphically illustrates chemical compositions of ITCS-gasoline and ITCS-diesel produced by HTP and multi-stage condensation (Example 1), and commercial-gasoline and commercial-diesel.

The chemical compositions of the gasoline and diesel products are shown in FIG. 12. One can see that the ITCS-gasoline is similar to commercial gasoline, and the ITCS-diesel is similar to commercial diesel.

Mass and energy balance calculations were conducted for Example 1 at a scale of 10 tons/day, as shown in Tables 1-3. Process water loadings were calculated based on the 1-to-20 water-to-plastic feed ratio employed in HTP, which gasoline, diesel, and vapor yields relating to estimated oil yields of 87% with 0.5% solid char formation. Related to the energy balance calculations, the amount of chilled water utilized is calculated based on the amount of cooling required to bring the product streams to desired separation temperatures and later to room temperature (Table 1).

In the energy balance for this process, the energy requirement for the reaction is based on best guess estimates, which is roughly 1.46 MJ per kilogram of plastic waste treated. The energy requirement for the chillers is based on the energy required to cool the used chilled water back to its original temperature of 4° C. In addition to minimal energy required for pump operation, the energies of the plastic waste feedstock and ITCS products were recorded and used to show the energy balance (Table 2). Considering the energy requirements for the reactor furnace operation, the produced vapor can be combusted at 90% efficiency to operate this unit. Additionally, knowing that electricity can be produced from vapor at a 50% efficiency and assuming a coefficient of performance equaling 4 for the chiller, the vapor byproduct can be further used to recover electricity at a return (Table 3). This result indicates ITCS can be an energy self-sufficient process.

TABLE 1

Mass Balance of HTP with Multi-Stage Condensation at 10 tons/day scale

| Stream | Inlet (kg/hr) | Outlet (kg/hr) |
|---|---|---|
| Plastic Waste | 416.7 | 0 |
| Process Water | 20.8 | 20.8 |
| Solid (Char) | 0 | 2.1 |
| Vapor | 0 | 52.1 |
| Gasoline | 0 | 210.8 |
| Diesel | 0 | 151.7 |
| Total | 437.5 | 437.5 |
| Cooling Water | 3443 | 3443 |

TABLE 2

Energy Balance of HTP with Multi-Staged Condensation at 10 tons/day scale

| Energy Unit/Source | Inlet (MJ/hr) | Inlet (MJ/kg of feed) | Outlet (MJ/hr) | Outlet (MJ/kg of feed) |
|---|---|---|---|---|
| Reactor | 608.4 | 1.5 | 0 | 0 |
| Chillers | −613.0 | −1.5 | 0 | 0 |
| Pumps | 0.5 | ~0 | 0 | 0 |
| Plastic Waste | −18115.5 | −43.5 | 0 | 0 |
| Solid (Char) | 0 | 0 | −54.6 | −0.1 |
| Vapor | 0 | 0 | −2453.9 | −5.9 |
| Gasoline | 0 | 0 | −9148.7 | −22.0 |
| Diesel | 0 | 0 | −6462.4 | −15.5 |
| Total | −18119.6 | −43.5 | −18119.6 | −43.5 |

TABLE 3

Energy Inputs and Outputs of HTP with Multi-Stage Condensation at 10 tons/day scale

| Energy Unit | Inlet (MJ/hr) | Inlet (MJ/kg of feed) |
|---|---|---|
| Reactor (Furnace) | 608.4 | 1.5 |
| Chillers (Elec.) | 153.3 | 0.4 |
| Pumps (Elec.) | 0.5 | ~0 |

TABLE 3-continued

Energy Inputs and Outputs of HTP with Multi-Stage Condensation at 10 tons/day scale

| Energy Source | Outlet (MJ/hr) | Outlet (MJ/kg of feed) |
|---|---|---|
| Vapor Combustion (Gas Furnace: 90% eff.) | 608.4 (14.4 kg/hr) | 1.5 |
| Vapor Combustion (Electricity: 50% eff.) | 889.0 (37.7 kg/hr) | 2.1 |
| Total (Output − Input) | 735.2 | 1.8 |

Example 2: HTP and Distillation

Figure 13:
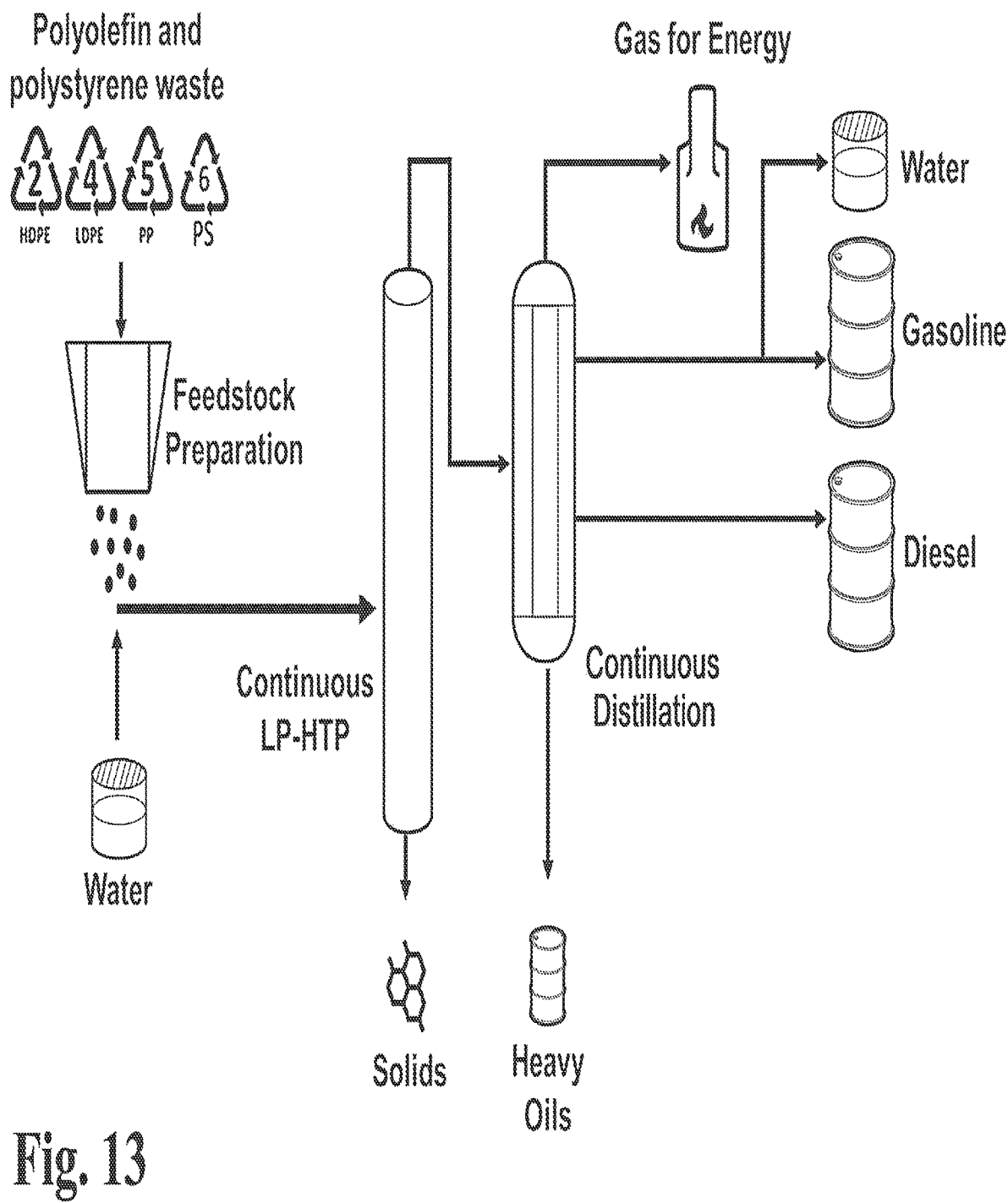
FIG. 13 is a process flow diagram for Example 2 of ITCS, which utilizes hydrothermal processing (HTP) and distillation.

A second example of ITCS is shown in FIG. 13. Here, plastic waste was used as the feedstock. The plastic feed was shredded for size reduction and then mixed with water for loading. The conversion process is HTP, and the separation process is distillation. The main products are gasoline and diesel.

Seven cases of Example 2 are further described as below, Case 1: PE, Case 2: PP, Case 3: PE:PP=1:1, Case 4: PS, Case 5: PE:PP=2:1, Case 6: PE:PP:PS=3:3:1, and Case 7: PE:PP=4:1. Two liquid products, a gasoline fraction and a diesel fraction, are obtained from distillation in each case (except Case 4, using sorted PS waste).

Figure 14:
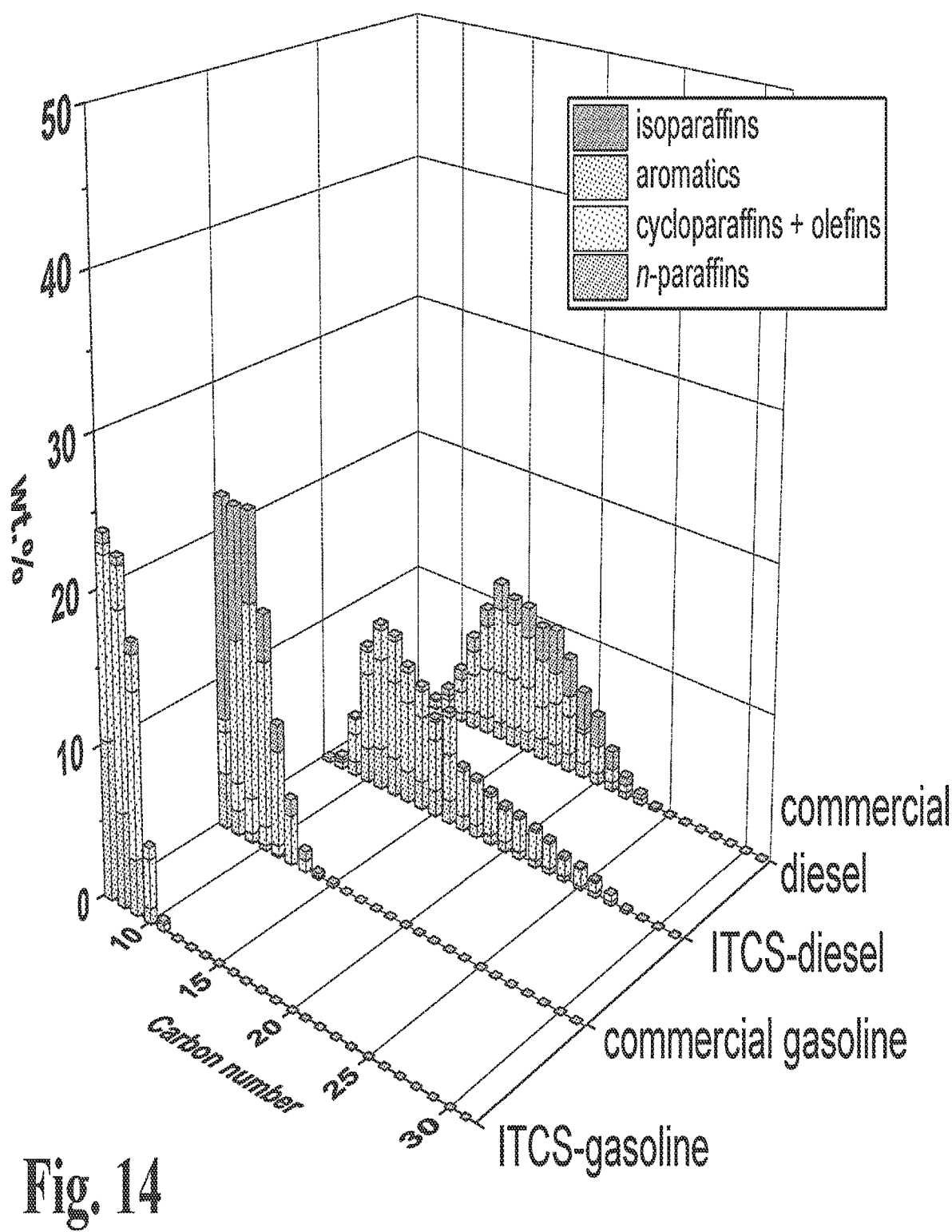
FIG. 14 graphically illustrates chemical compositions of ITCS-gasoline and ITCS-diesel (Example 2, Case 1: PE), and commercial-gasoline and commercial-diesel.

In Case 1, sorted PE waste is used as feedstock. The diesel fraction is similar to commercial diesel in terms of both C #distribution and chemical composition (FIG. 14). Detailed analyses showed that the diesel fraction met all the properties (viscosity, density, cloud point, flash point, sulfur content, cetane number) as No. 1 ultra-low-sulfur diesel with a high Cetane Number (CN) of 61. The gasoline fraction has a similar C #distribution as commercial gasoline, but it has less isoparaffins. For this reason, this fraction is not a good gasoline product, but it has potential to be a gasoline blendstock.

Figure 15:
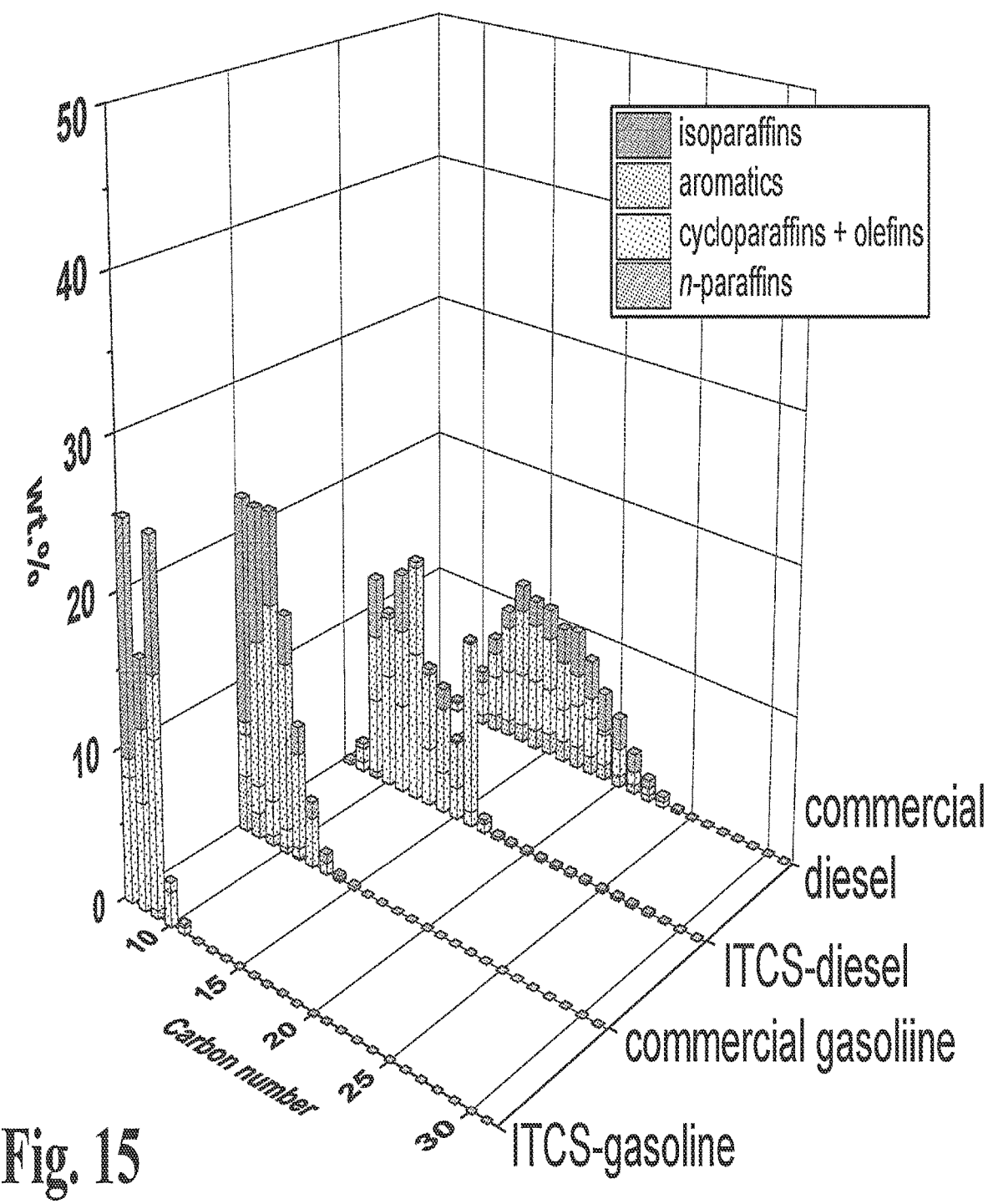
FIG. 15 graphically illustrates chemical composition of ITCS-gasoline and ITCS-diesel (Example 2, Case 2: PP), and commercial-gasoline and commercial-diesel.

In Case 2, sorted PP waste is used as feedstock for ITCS. The gasoline fraction is similar to commercial gasoline in terms of both C #distribution and chemical composition (FIG. 15). The gasoline fraction has a high-octane number because of its high content of isoparaffins and aromatics. The diesel fraction has a similar C #distribution as commercial diesel, but it is in short of n-paraffins. For this reason, the diesel fraction has a CN of 40, which is the minimum requirement of commercial diesel.

Figure 16:
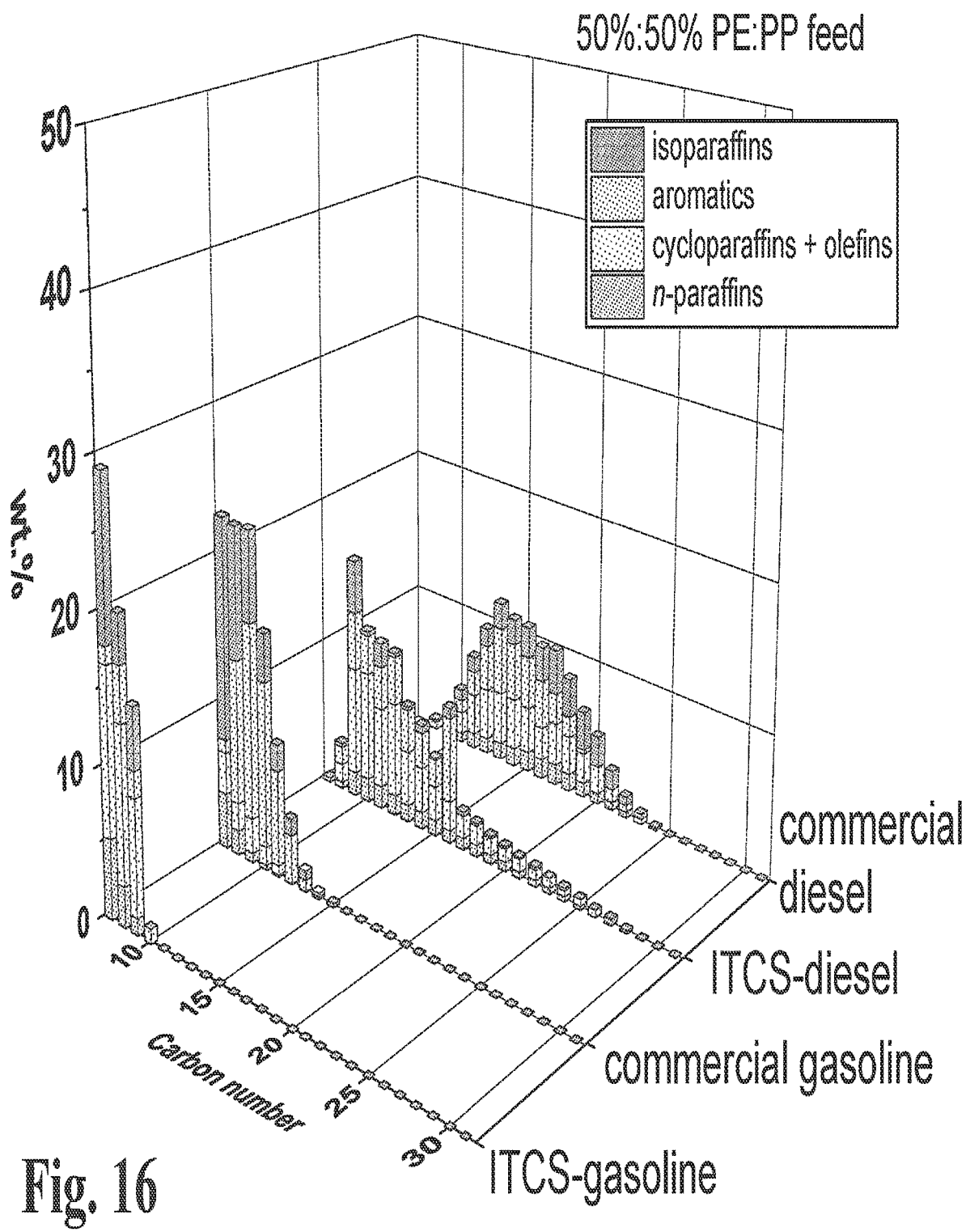
FIG. 16 graphically illustrates chemical compositions of ITCS-gasoline and ITCS-diesel (Example 2, Case 3: PE:PP 1:1 w:w), and commercial-gasoline and commercial-diesel.

In Case 3, a mixed waste of PE:PP with 1:1 mass ratio is used as feedstock for ITCS. The gasoline fraction is similar to commercial gasoline in terms of both C #distribution and chemical composition (FIG. 16). The diesel fraction is similar to commercial diesel in terms of both C #distribution and chemical composition.

Figure 17A:
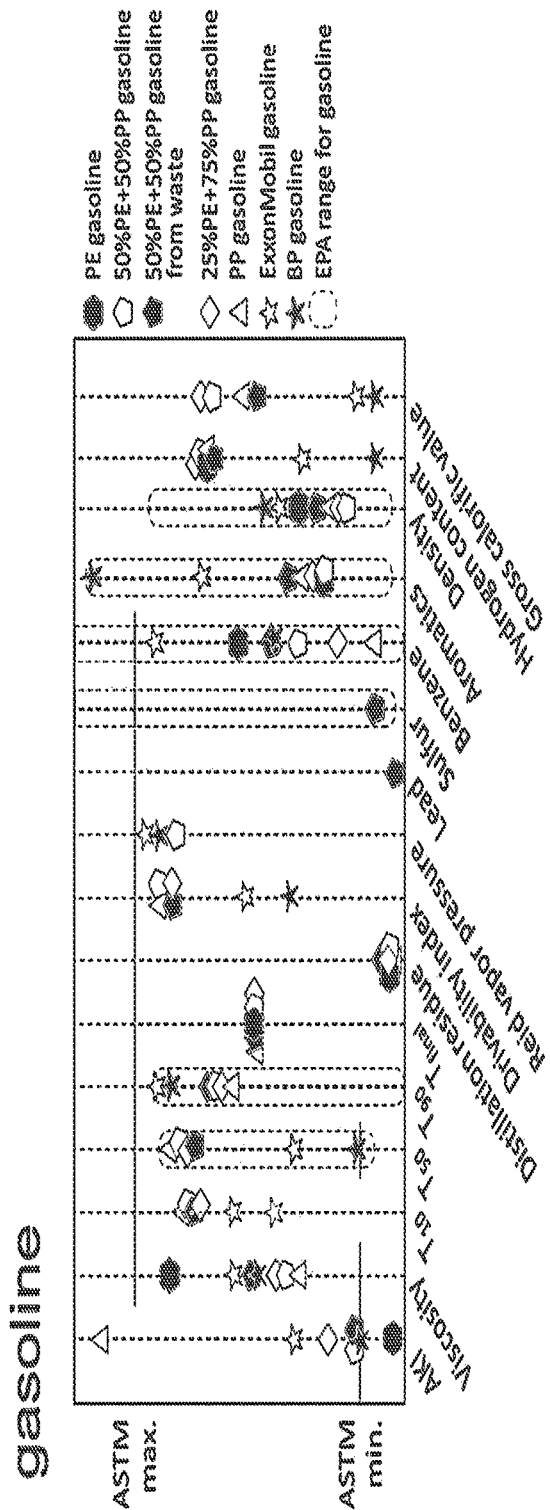
FIG. 17A graphically illustrates fuel properties of the gasoline products for ITCS, Example 2, Cases 1-3.

The gasoline and diesel products for Cases 1-3 were measured for their fuel properties, as shown in FIG. 17A. Anti-knocking index (AKI) is the average of the research octane number and the motor octane number. For all three cases, the gasoline products met the ASTM requirement of AKI. They had a lower aromatic content and a higher hydrogen content than commercial gasoline, and hence a higher gross calorific value. The benzene contents of the gasoline fractions were within the ASTM limit. The density values were similar to those reported by EPA from 1999 to 2019. Furthermore, the gasoline fractions met all other properties required by ASTM D4814, including viscosity, $T_{10}$, $T_{50}$, $T_{90}$, $T_{final}$, distillation residue, drivability index, and Reid vapor pressure.

Figure 17B:
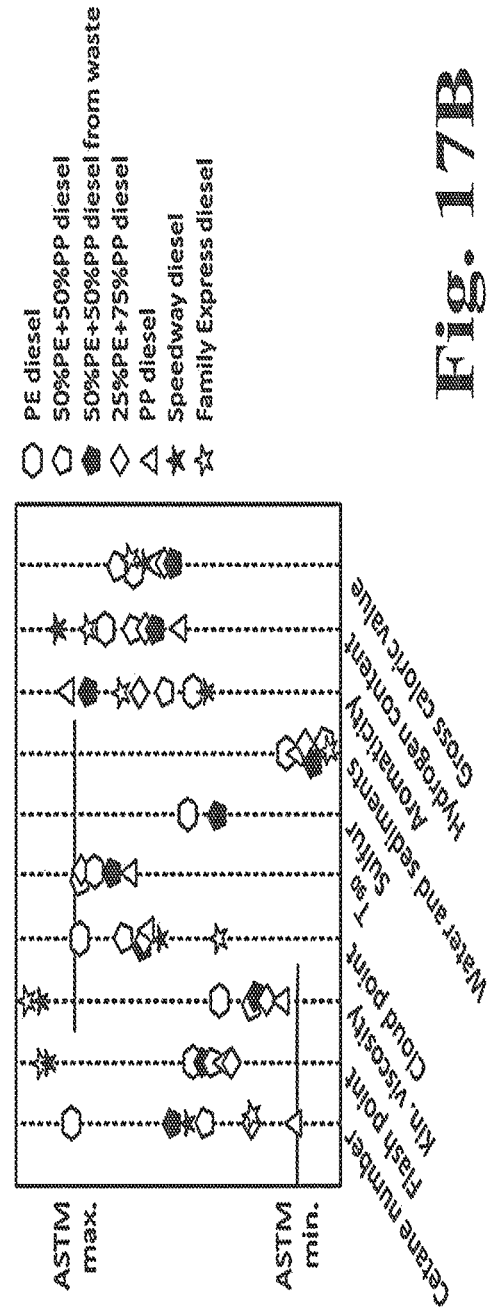
FIG. 17B graphically illustrates fuel properties of the diesel products for ITCS, Example 2, Cases 1-3.

All diesel products of the three cases met the ASTM requirements for No. 1 diesel, including CN, flash point, viscosity, cloud point, $T_{90}$, water and sediment content, and sulfur content, FIG. 17B. The values of aromaticity, hydrogen content, and gross calorific value for the diesel fractions were similar to those of commercial diesel. In summary, the diesel fractions for all three cases met or exceeded all the fuel properties required by ASTM D975 for No. 1 ultra-low-sulfur diesel.

Figure 18:
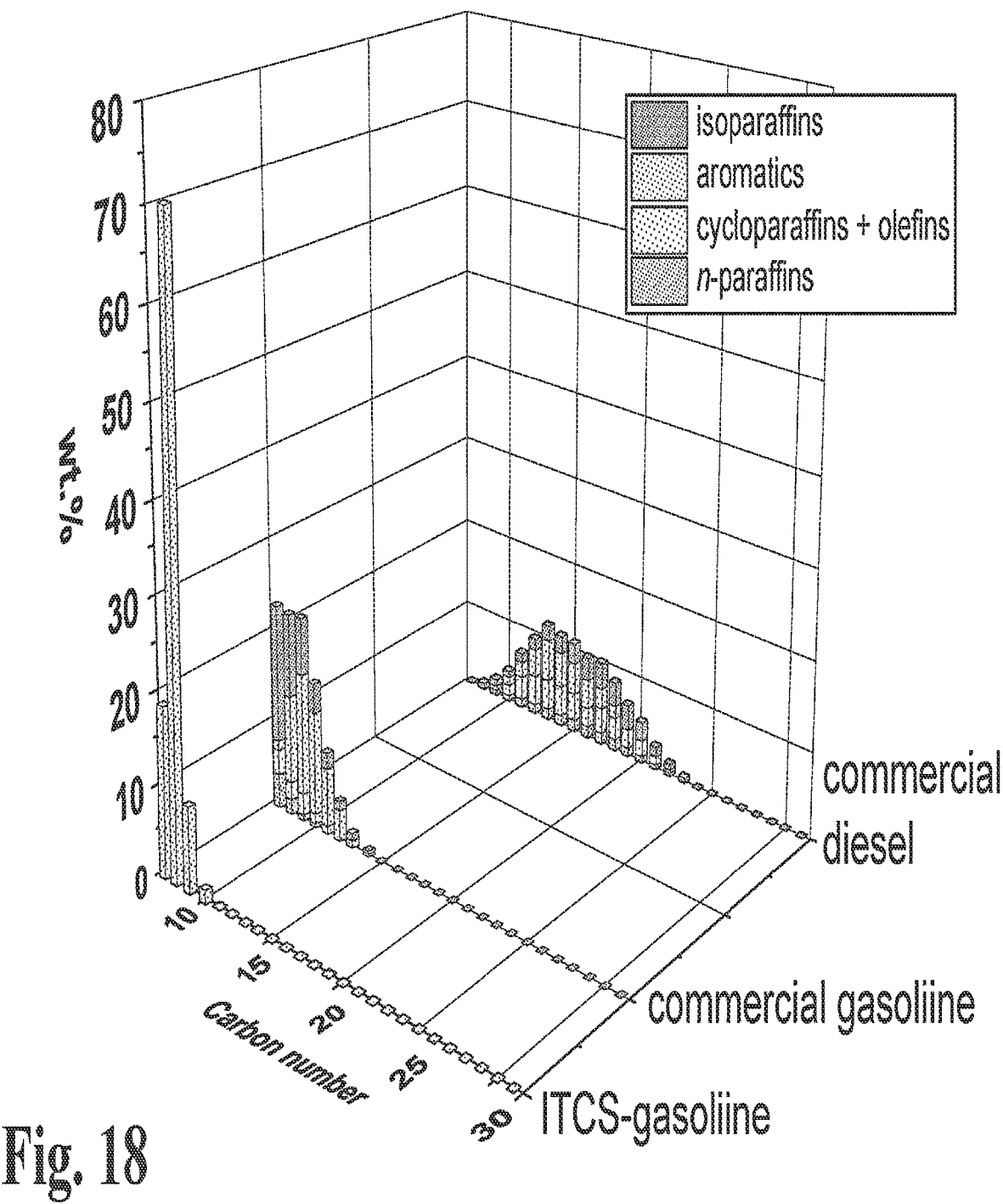
FIG. 18 graphically illustrates chemical compositions of ITCS-gasoline (Example 2, Case 4: PS), and commercial-gasoline and commercial-diesel. No ITCS-diesel was produced in this result.

In Case 4, sorted PS waste is used as feedstock for ITCS. The oil is rich in aromatics, like toluene, ethylbenzene, styrene, and isopropylbenzene (FIG. 18). The oil can be used as a good gasoline additive (octane number booster) for increasing octane number.

Figure 19:
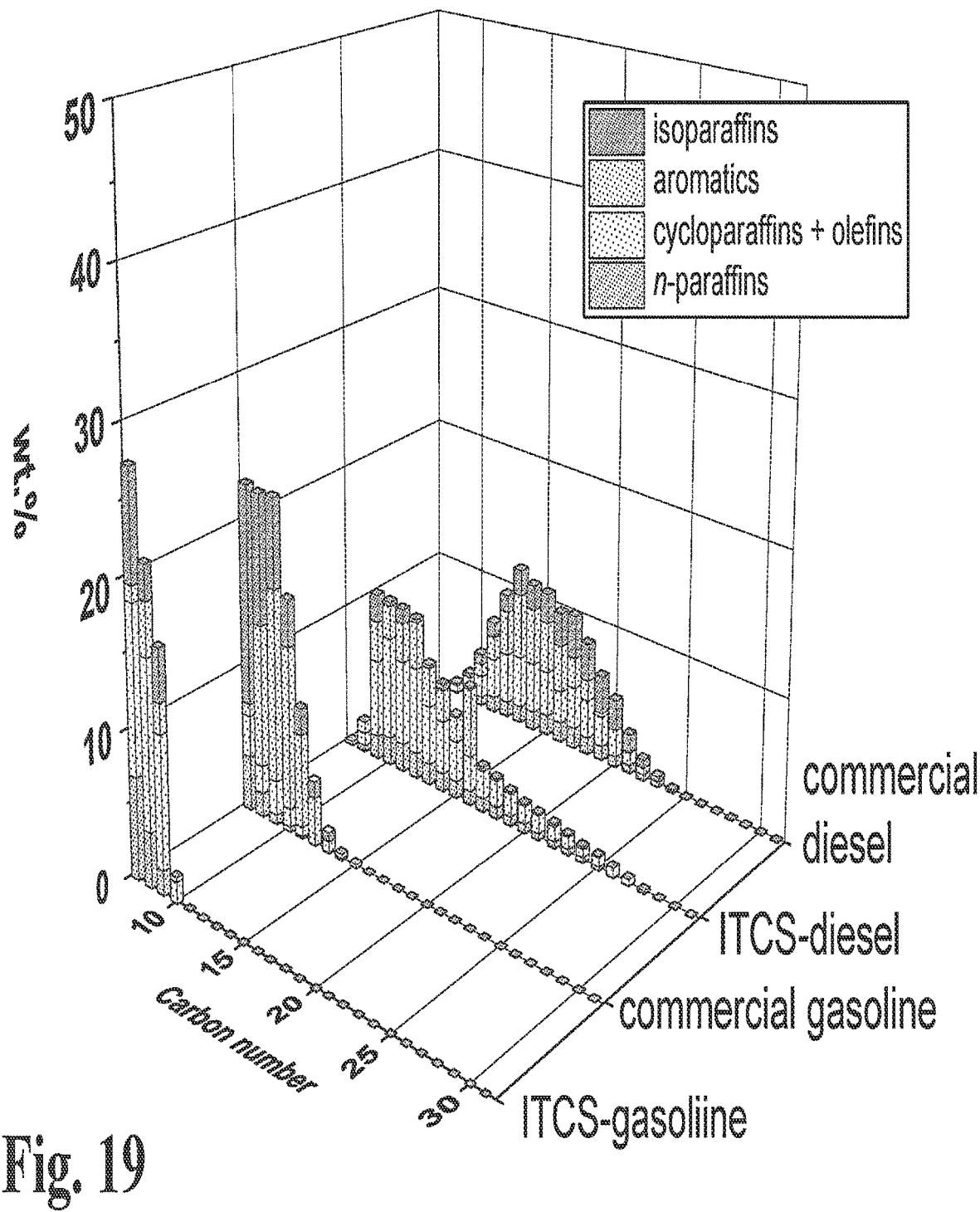
FIG. 19 graphically illustrates chemical compositions of ITCS-gasoline and ITCS-diesel (Example 2, Case 5: PE:PP 2:1 w:w, after removing Types 1, 3, 6, and 7 from natural mixed plastic waste), and commercial-gasoline and commercial-diesel.
Figure 20:
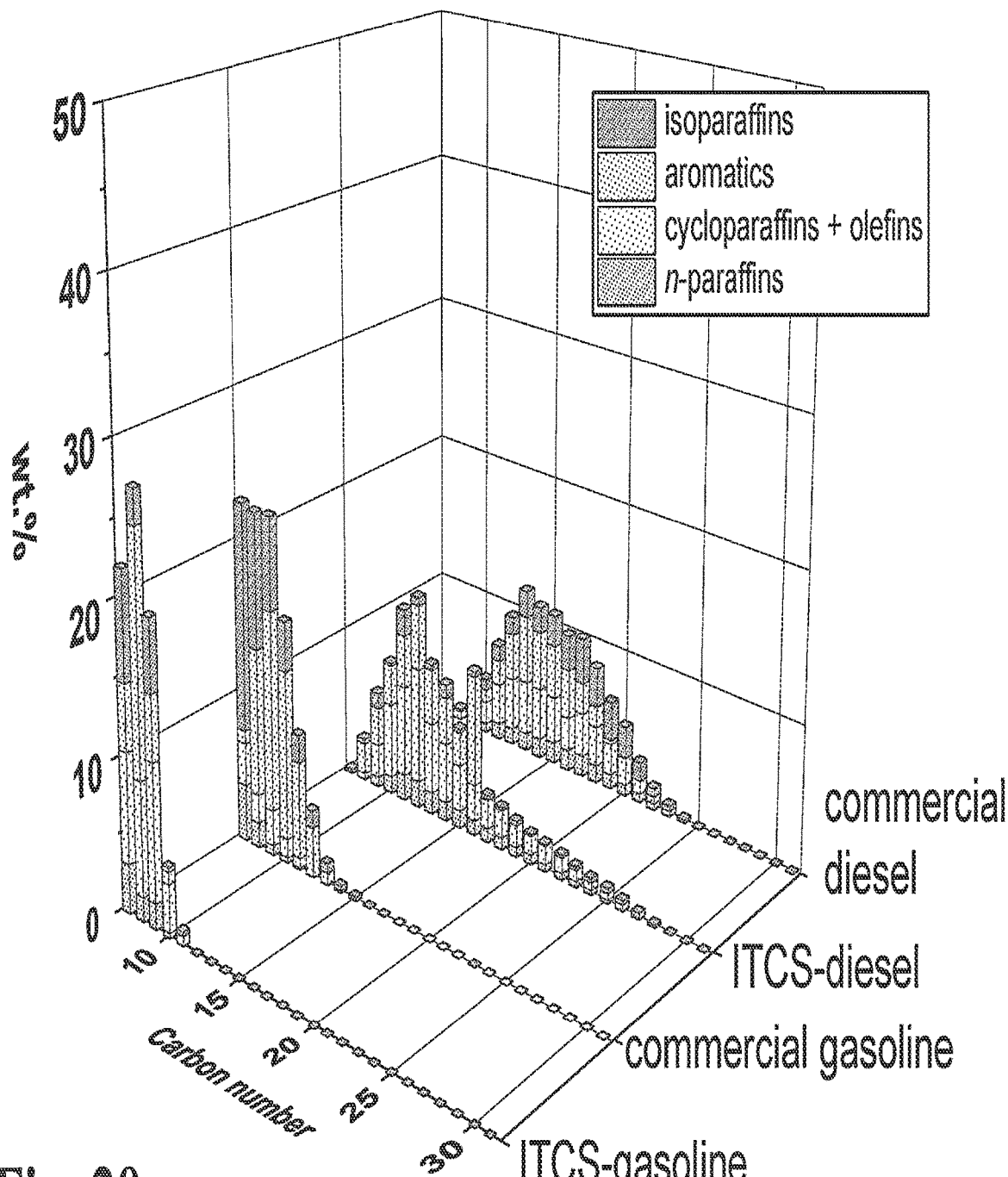
FIG. 20 graphically illustrates chemical compositions of ITCS-gasoline and ITCS-diesel (Example 2, Case 6: PE:PP:PS 3:3:1 w:w: w, after removing Types 1, 2, 3, and 7 from natural mixed plastic waste), and commercial-gasoline and commercial-diesel.

In Case 5, a mixed waste of PE:PP with 2:1 mass ratio, which is based on the natural mixed plastic waste composition after removing plastic Types 1, 3, 6, and 7, is used as feedstock for ITCS. The gasoline fraction is similar to commercial gasoline in terms of both C #distribution and chemical composition (FIG. 19). The diesel fraction is similar to commercial diesel in terms of both C #distribution and chemical composition. The costs for this feedstock are estimated to be about $70/ton In Case 6, a mixed waste of PE:PP:PS with 3:3:1 mass ratio, which is based on the natural mixed plastic waste composition after removing plastic Types 1, 2, 3, and 7 is used as feedstock for ITCS. The gasoline fraction is similar to commercial gasoline in terms of both C #distribution and chemical composition (FIG. 20). With the presence of PS-derived oil, the gasoline fraction is expected to have a higher octane number than the gasoline fraction in Case 5. The diesel fraction is similar to commercial diesel in terms of both C #distribution and chemical composition. This waste has a higher feedstock cost than the Type 3-7 waste, $5/ton, because Types 3 and 7 need to be removed from the Type 3-7 waste. This additional sorting cost is estimated to be about $70/ton.

Figure 21:
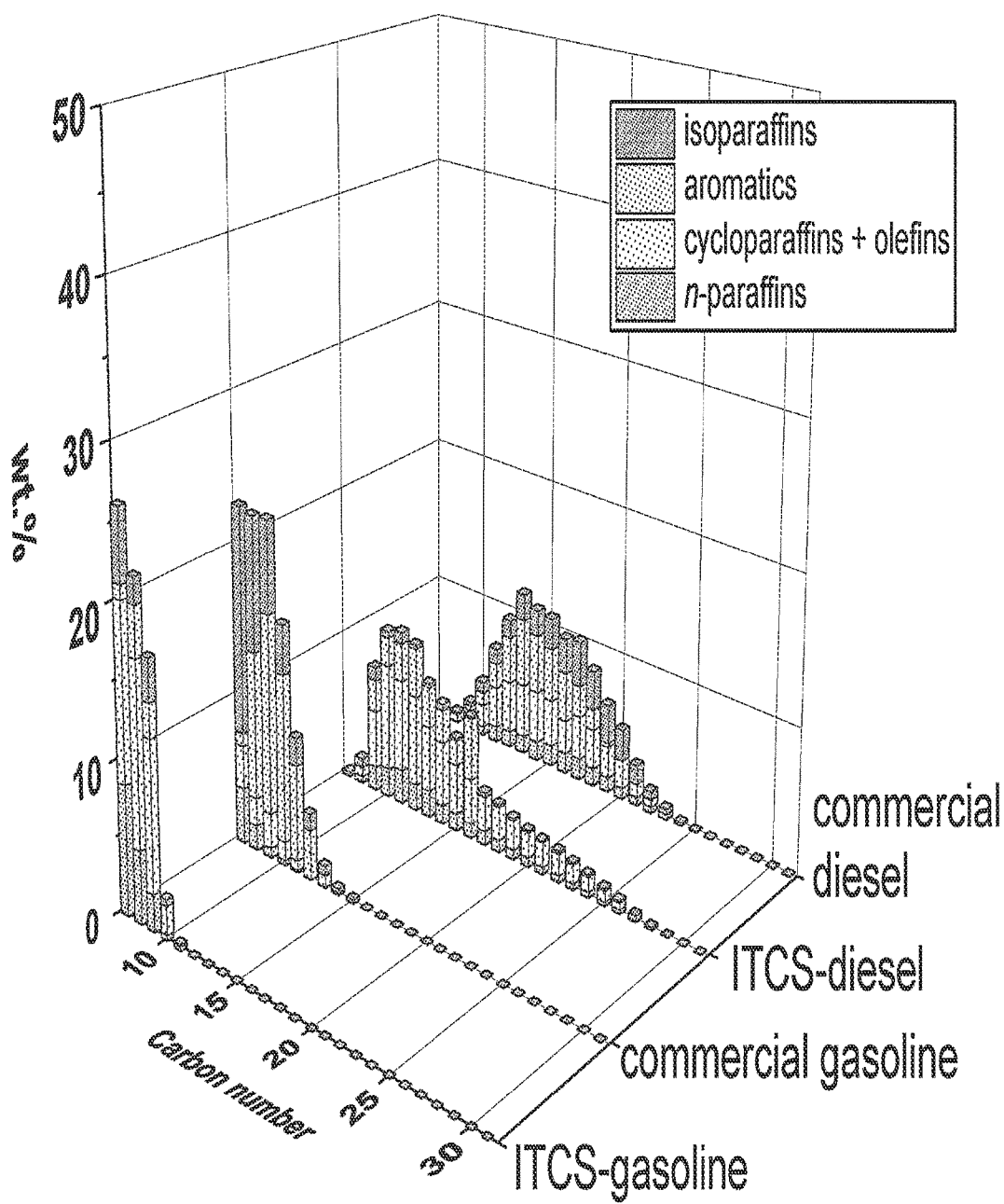
FIG. 21 graphically illustrates chemical compositions of ITCS-gasoline and ITCS-diesel (Example 2, Case 7: PE:PP films 4:1 w:w), and commercial-gasoline and commercial-diesel.

In Case 7, a mixed waste of PE:PP with 4:1 mass ratio, which is based on the plastic film waste composition, is used as feedstock for ITCS. The gasoline fraction is similar to commercial gasoline in terms of both C #distribution and chemical composition (FIG. 21). The ON of the gasoline fraction is lower than the gasoline fraction in Case 5 and 6, because of the high ratio of PE to PP. The diesel fraction is similar to commercial diesel in terms of both C #distribution and chemical composition.

Mass and energy balances calculations for Example 2 were conducted at a scale of 10 tons/day. The same water loading used in Example 1 (1-to-20 water-to-plastic ratio) is employed in HTP, followed by distillation at a 65% distillate rate and with a reflux ratio of 1. Through this separation setup, the same quantities are employed in this setup to recover similar product yields as discussed previously (Table 4).

In the energy balance for this process, the energy requirement for the reaction is again based on estimates made in previous publications, with energy requirements for distillation now included in the energy balance. Once again, energy requirements for chilling water and operating pumps and energy properties of all feedstocks and products are included (Table 5). Once again, by combusting vapor in a 90% efficiency furnace and a 50% efficiency generator, enough energy can be produced to operate this setup and recover electricity at a return (Table 6).

TABLE 4

Mass Balance of HTP with Distillation at 10 tons/day scale

| Stream | Inlet (kg/hr) | Outlet (kg/hr) |
|---|---|---|
| Plastic Waste | 416.7 | 0 |
| Process Water | 20.8 | 20.8 |
| Solid (Char) | 0 | 2.1 |
| Vapor | 0 | 52.1 |
| Gasoline | 0 | 210.8 |
| Diesel | 0 | 151.7 |
| Total | 437.5 | 437.5 |
| Cooling Water | 2127 | 2127 |

TABLE 5

Energy Balance of HTP with Distillation at 10 tons/day scale

| Energy Unit/Source | Inlet (MJ/hr) | Inlet (MJ/kg of feed) | Outlet (MJ/hr) | Outlet (MJ/kg of feed) |
|---|---|---|---|---|
| Reactor | 608.4 | 1.5 | 0 | 0 |
| Chillers | −379.3 | −0.9 | 0 | 0 |
| Pumps | 0.4 | ∼0 | 0 | 0 |
| Distillation (Condenser) | −517.0 | −1.2 | 0 | 0 |
| Distillation (Reboiler) | 283.4 | 0.7 | 0 | 0 |
| Plastic Waste | −18115.5 | −43.5 | 0 | 0 |
| Solid (Char) | 0 | 0 | −54.6 | −0.1 |
| Vapor | 0 | 0 | −2453.9 | −5.9 |
| Gasoline | 0 | 0 | −9148.7 | −22.0 |
| Diesel | 0 | 0 | −6462.4 | −15.5 |
| Total | −18119.6 | −43.5 | −18119.6 | −43.5 |

TABLE 6

Energy Inputs and Outputs of HTP with Distillation at 10 tons/day scale

| Energy Unit | Inlet (MJ/hr) | Inlet (MJ/kg of feed) |
|---|---|---|
| Reactor (Furnace) | 608.4 | 1.5 |
| Chillers (Elec.) | 94.8 | 0.2 |
| Pumps (Elec.) | 0.4 | 0.0 |
| Distillation Condenser | 517.0 | 1.2 |
| Distillation Reboiler | 283.4 | 0.7 |

| Energy Source | Outlet (MJ/hr) | Outlet (MJ/kg of feed) |
|---|---|---|
| Vapor Combustion (Gas Furnace: 90% eff.) | 608.4 (14.4 kg/hr) | 1.5 |
| Vapor Combustion (Electricity: 50% eff.) | 889.0 (37.7 kg/hr) | 2.1 |
| Total (Output − Input) | −6.7 | −0.0 |

Example 3: Pyrolysis and Multi-Stage Condensation

Figure 22:
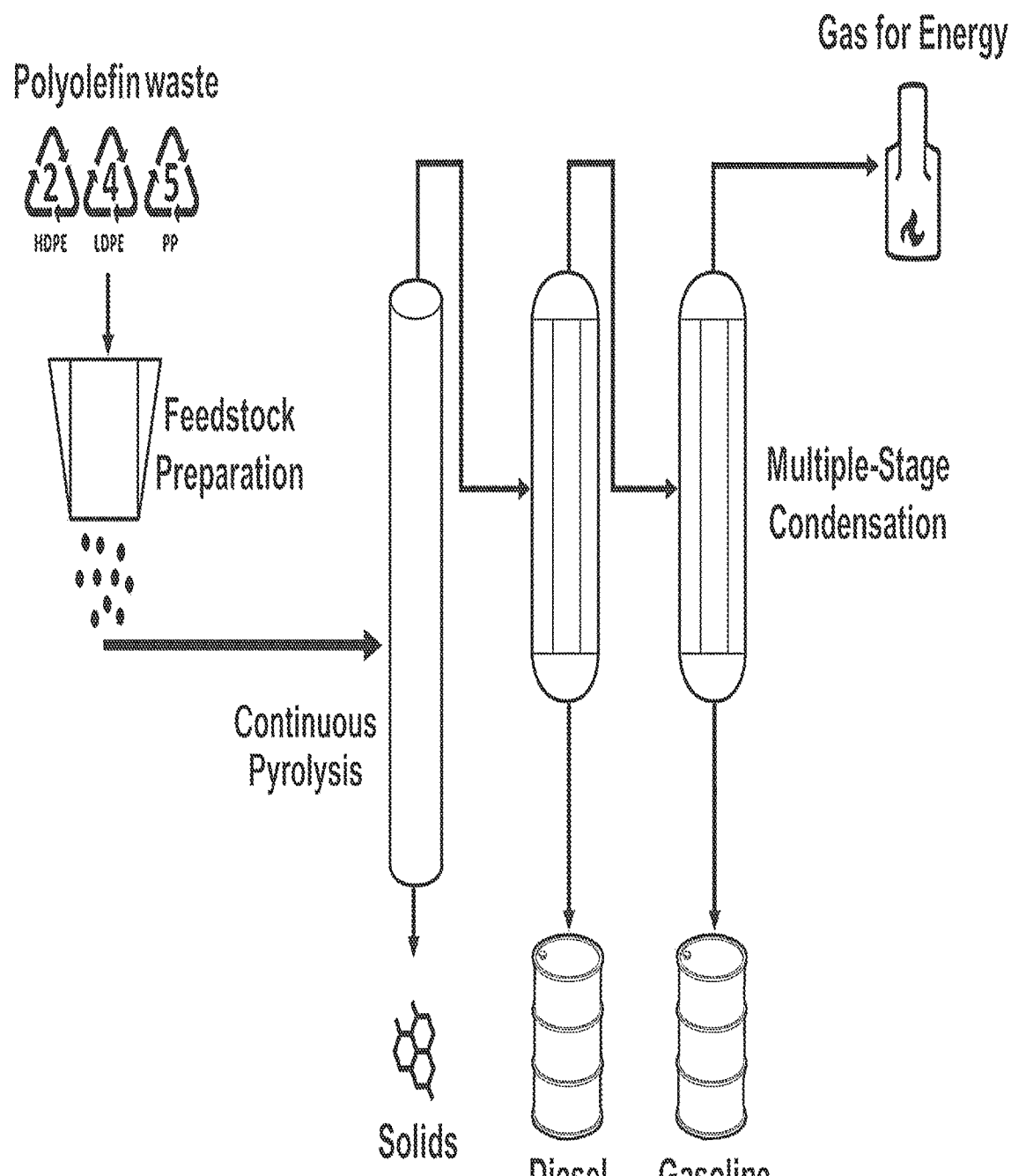
FIG. 22 is a process flow diagram for Example 3 of ITCS, which utilizes pyrolysis and multi-stage condensation.

A third example of ITCS is shown as FIG. 22. Here, plastic waste was used as the feedstock. The plastic feed was shredded for size reduction and then fed into the reactor. The conversion process is pyrolysis. The separation process is multi-stage condensation using two condensers are used to separate diesel and gasoline sequentially. The main products are gasoline and diesel.

Figure 23:
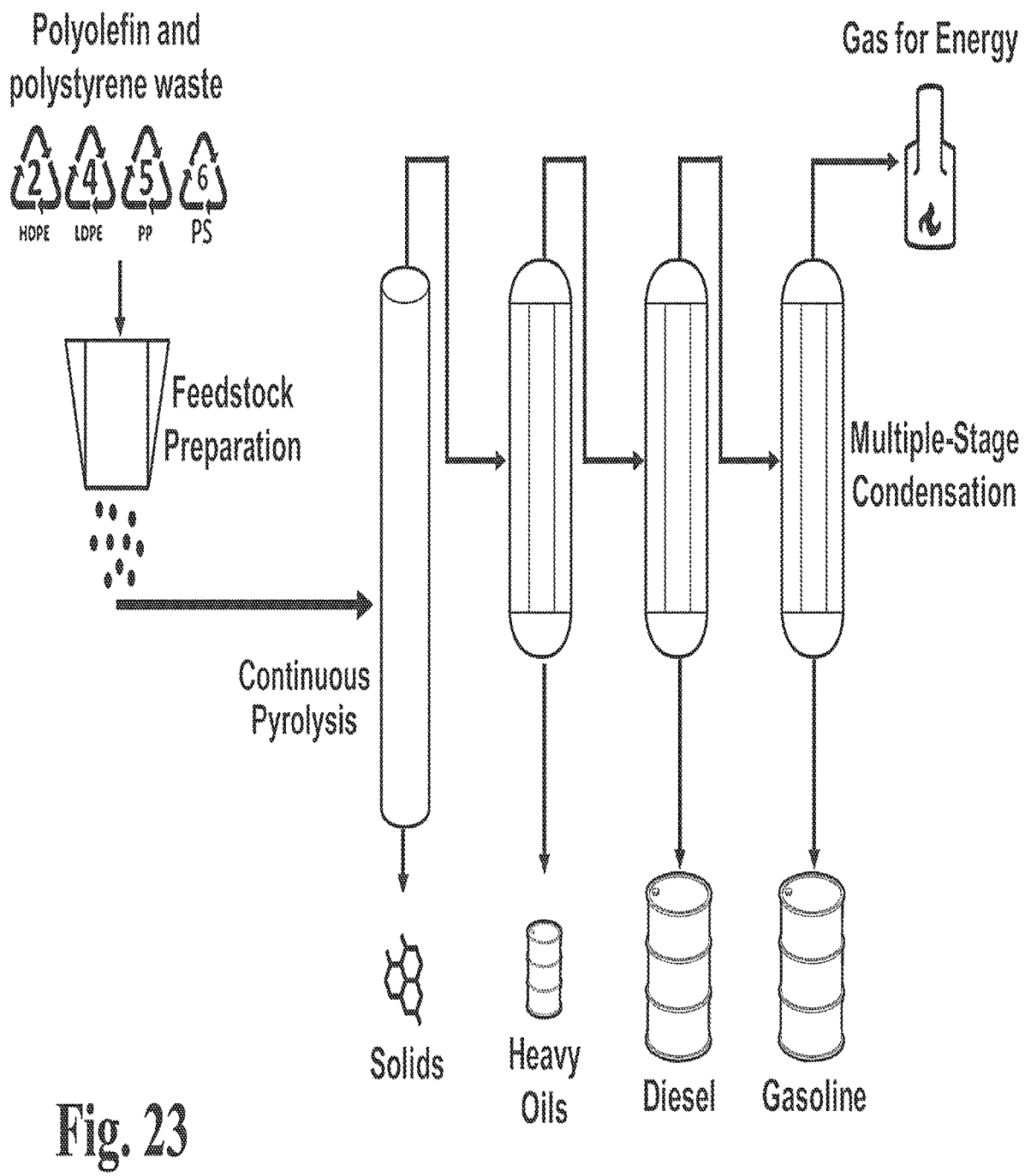
FIG. 23 is a process flow diagram for Example 3 when PS is in the plastic feed. An extra condenser was used to separate heavy oils before separating diesel and gasoline.

With cases where PS is in the plastic feed, the products will also contain heavy oils. Therefore, another condenser is used for separating heavy oil before separating diesel and gasoline, as shown as FIG. 23.

Figure 24:
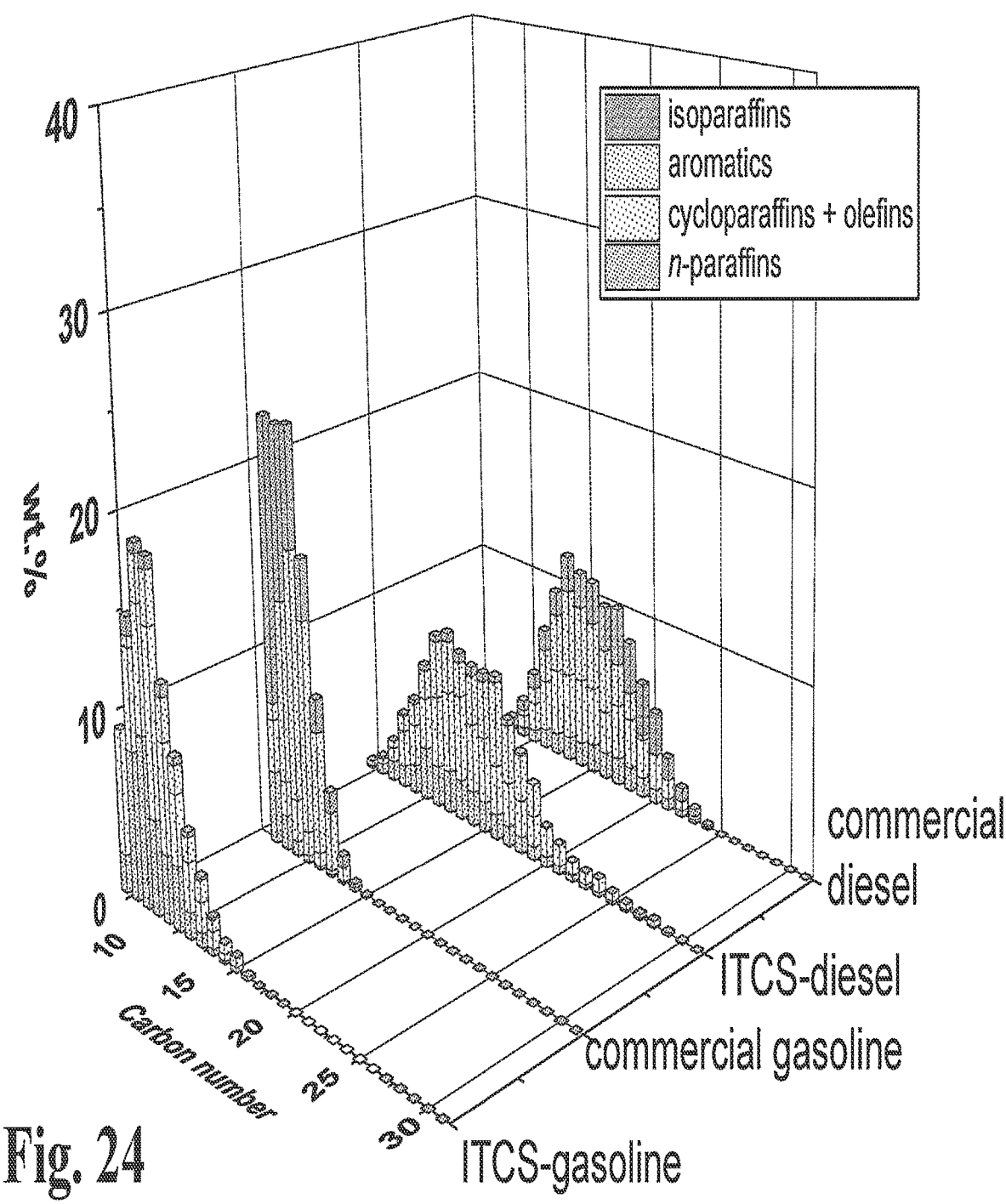
FIG. 24 graphically illustrates chemical compositions of ITCS-gasoline and ITCS-diesel produced by pyrolysis and multi-stage condensation (Example 3), and commercial-gasoline and commercial-diesel.

The chemical compositions of the gasoline and diesel products are shown in FIG. 24. One can see that the ITCS-gasoline is similar to commercial gasoline, and the ITCS-diesel is similar to commercial diesel.

Mass and energy balances were conducted for Example 3 at a scale of 10 tons/day. As pyrolysis is conducted without the presence of water, no process water is included in this mass balance. However, chilled water is still required to cool the produced oils to optimum separation temperatures and then later cool the products to room temperature. Through this separation setup, the same quantities are employed in this setup to recover similar product yields (Table 7).

In the energy balance for this process, due to additional steps required for upgrading these oils produced from pyrolysis, the energy requirements for the reaction and the pyrolysis-required treatment are included. Once again, similar to Example 1, energy requirements for chilling water and operating pumps and energy properties of all feedstocks and products are included (Table 8). Once again, by combusting vapor in a 90% efficiency furnace and a 50% efficiency generator, enough energy can be produced to operate this setup and recover electricity at a return (Table 9).

TABLE 7

Mass Balance of Pyrolysis with Multi-Stage Condensation at 10 tons/day scale

| Stream | Inlet (kg/hr) | Outlet (kg/hr) |
|---|---|---|
| Plastic Waste | 416.7 | 0 |
| Process Water | 0 | 0 |
| Solid (Char) | 0 | 4.2 |
| Vapor | 0 | 58.3 |
| Gasoline | 0 | 206.0 |
| Diesel | 0 | 148.2 |
| Total | 416.7 | 416.7 |
| Cooling Water | 3056 | 3056 |

TABLE 8

Energy Balance of Pyrolysis with Multi-Stage Condensation at 10 tons/day scale

| Energy Unit/Source | Inlet (MJ/hr) | Inlet (MJ/kg of feed) | Outlet (MJ/hr) | Outlet (MJ/kg of feed) |
|---|---|---|---|---|
| Reactor and Pyrolysis Treatment | 712.6 | 1.7 | 0 | 0 |
| Chillers | −707.9 | −1.7 | 0 | 0 |
| Pumps | 0.4 | ∼0 | 0 | 0 |
| Plastic Waste | −18115.5 | −43.5 | 0 | 0 |
| Solid (Char) | 0 | 0 | −109.2 | −0.3 |
| Vapor | 0 | 0 | −2747.7 | −6.6 |
| Gasoline | 0 | 0 | −8939.6 | −21.5 |
| Diesel | 0 | 0 | −6913.9 | −15.2 |
| Total | −18110.4 | −43.5 | −18110.4 | −43.5 |

TABLE 9

Energy Inputs and Outputs of Pyrolysis with Multi-Stage Condensation at 10 tons/day scale

| Energy Unit | Inlet (MJ/hr) | Inlet (MJ/kg of feed) |
|---|---|---|
| Reactor (Furnace) and Pyrolysis Treatment | 712.6 | 1.7 |
| Chillers (Elec.) | 177.0 | 0.4 |
| Pumps (Elec.) | 0.4 | ~0 |
| Energy Source | Outlet (MJ/hr) | Outlet (MJ/kg of feed) |
| Vapor Combustion (Gas Furnace: 90% eff.) | 837.6 (16.8 kg/hr) | 2.0 |
| Vapor Combustion (Electricity: 50% eff.) | 978.0 (41.5 kg/hr) | 2.3 |
| Total (Output − Input) | 925.7 | 2.2 |

Example 4: Naphtha and Diesel

Figure 25:
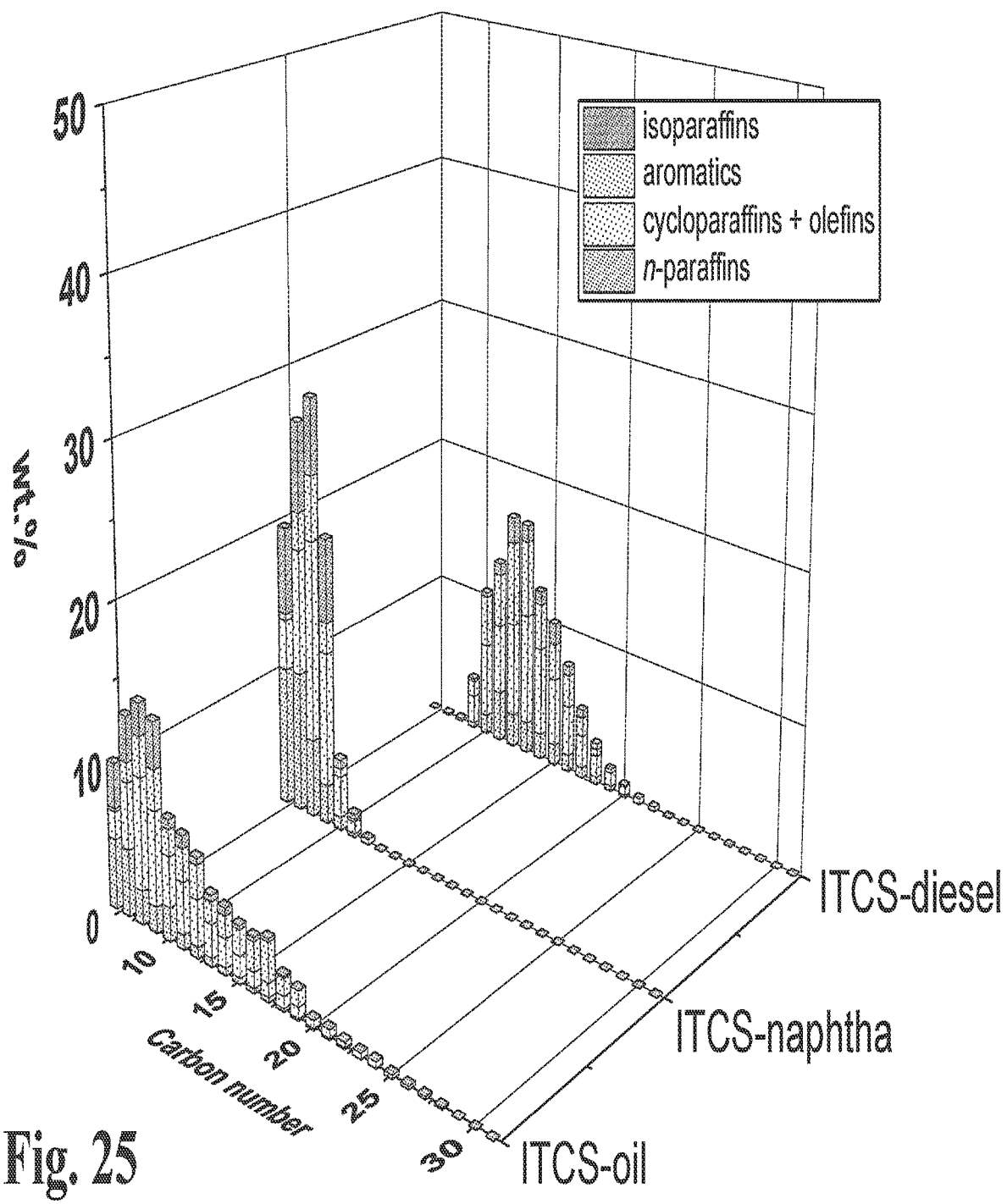
FIG. 25 graphically illustrates chemical compositions of ITCS-oils, ITCS-naphtha, and ITCS-diesel (Example 4).

In this example, ITCS produces naphtha and diesel. Naphtha is a hydrocarbon mixture in the carbon number range of $C_4$-$C_{11}$, and is usually used as the feedstock for producing gasoline. Therefore, the same conversion and separation conditions as shown in Example 2 can be applied here. The chemical compositions of ITCS-oil, ITCS-naphtha and ITCS-diesel are shown in FIG. 25. The mass balance is shown as Table 10.

TABLE 10

Mass Balance of ITCS at 10 tons/day scale for Recovery of Naphtha and Diesel

| Stream | Inlet (kg/hr) | Outlet (kg/hr) |
|---|---|---|
| Plastic Waste | 416.7 | 0 |
| Process Water | 20.8 | 20.8 |
| Solid (Char) | 0 | 2.1 |
| Vapor | 0 | 52.1 |
| Naphtha | 0 | 190.8 |
| Diesel | 0 | 171.7 |
| Total | 437.5 | 437.5 |
| Cooling Water | 2127 | 2127 |

Example 5: Jet Fuels

Figure 26:
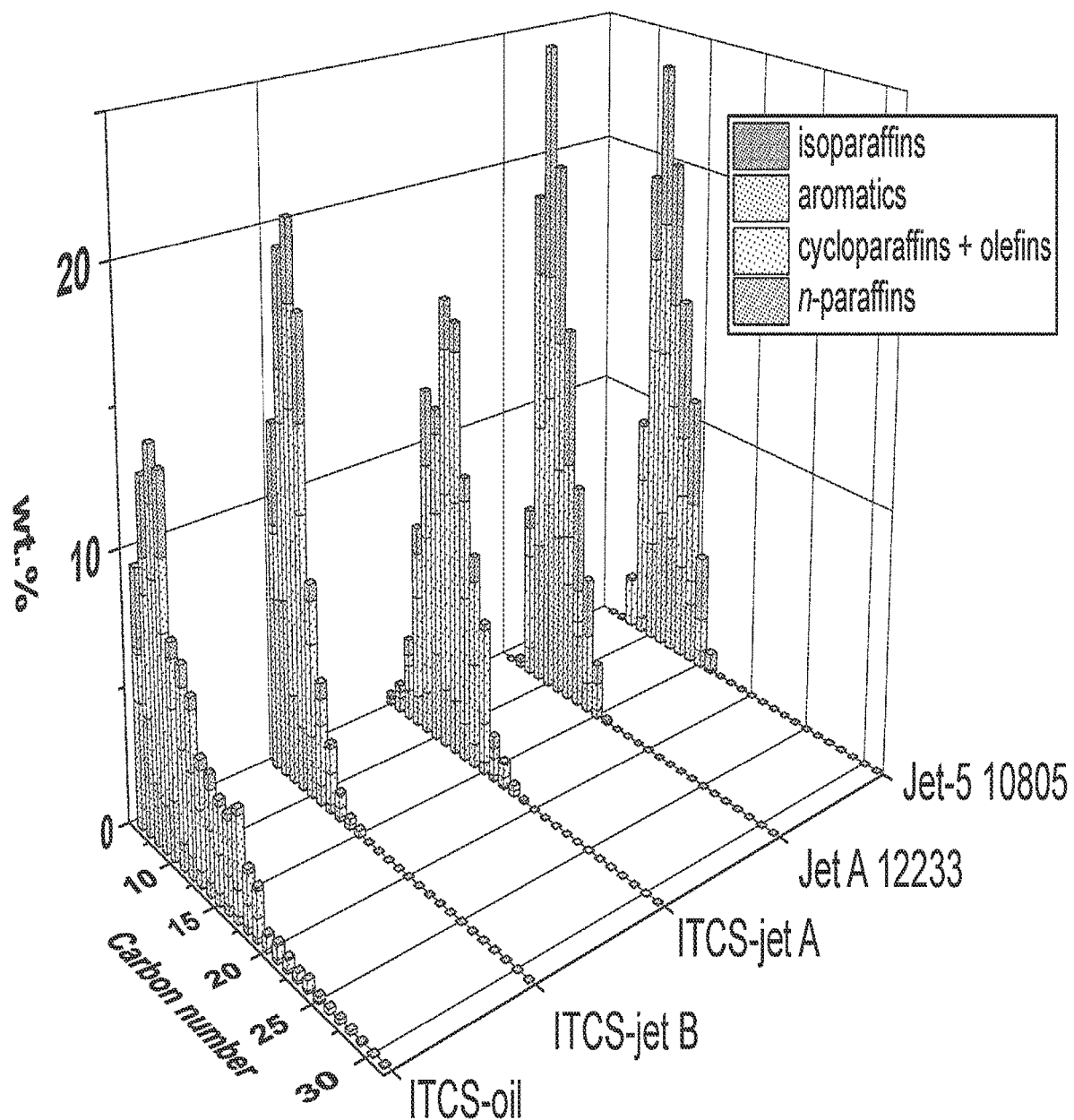
FIG. 26 graphically illustrates chemical compositions of ITCS-oils, ITCS-Jet-A and ITCS-Jet-B, and commercial-Jet-A fuels (Example 5).

In this example ITCS produces jet fuels. Jet Fuel A (JF-A) is a hydrocarbon mixture in the carbon number range of $C_8$-$C_{16}$, and is commonly used in the United States. Jet Fuel B (JF-B) is a hydrocarbon mixture in the carbon number range of $C_5$-$C_{15}$, and is more commonly utilized in colder climates due to its lower freezing point compared to Jet Fuel A. Therefore, a similar setup as the one shown in FIG. 11 is utilized to minimize the amounts of heavy oil within the jet fuels by utilizing separation surrounding the boiling points of $C_7$ and $C_9$. The chemical compositions of ITCS-oils, ITCS-Jet-A, and ITCS-Jet-B are shown in FIG. 26. The mass balance for Example 5 is shown as Table 11.

TABLE 11

Mass Balance of ITCS at 10 tons/day scale for Recovery of Jet Fuel A, Jet Fuel B, and Heavy Oil

| Stream | Inlet (kg/hr) | Outlet (kg/hr) |
|---|---|---|
| Plastic Waste | 416.7 | 0 |
| Process Water | 20.8 | 20.8 |
| Solid (Char) | 0 | 2.1 |
| Vapor | 0 | 52.1 |
| Jet Fuel B | 0 | 202.4 |
| Jet Fuel A | 0 | 26.8 |
| Heavy Oil | 0 | 133.3 |
| Total | 437.5 | 437.5 |
| Cooling Water | 3443 | 3443 |

Example 6 Lubricating Oils

In this example, ITCS produces lubricating oils. Lubricating oils are various hydrocarbon mixtures in the carbon number range of $C_{14}$-$C_{50}$, and are utilized in order to lubricate mechanical parts such as those found in motors and combustion engines. As some of the previously discussed setups (such as Example 5) use an extra condenser stage to collect a heavy oil fraction that occupies this carbon number distribution, a similar setup as shown in FIG. 11 can be utilized to recover lubricating oils while separating them from other lighter hydrocarbon streams, utilizing separation around the boiling points of $C_7$-$C_{14}$. The mass balance for Example 6 is shown as Table 12.

TABLE 12

Mass Balance of ITCS at 10 tons/day scale for Recovery of Jet Fuel A, Jet Fuel B, and Lubricating Oil

| Stream | Inlet (kg/hr) | Outlet (kg/hr) |
|---|---|---|
| Plastic Waste | 416.7 | 0 |
| Process Water | 20.8 | 20.8 |
| Solid (Char) | 0 | 2.1 |
| Vapor | 0 | 52.1 |
| Jet Fuel B | 0 | 202.4 |
| Jet Fuel A | 0 | 26.8 |
| Heavy Oil | 0 | 133.3 |
| Total | 437.5 | 437.5 |
| Cooling Water | 3443 | 3443 |

Techno-Economic Analysis (TEA) for ITCS Producing Gasoline and Diesel

Preliminary TEA was performed for ITCS producing gasoline and diesel, as shown in Table 13. One can see that ITCS can be economical at scales equal to or larger than 100 tons/day. At a larger scale, the potential profit also increases. Compared to catalytic pyrolysis at the same scale, 300 tons/day, ITCS has a higher potential profit and shorter payback time.

TABLE 13

Preliminary TEA of ITCS at scales of 10, 100, 250, and 300 tons/day, and catalytic pyrolysis at a scale of 300 tons/day for comparison.

| | ITCS | ITCS | ITCS | ITCS | Catalytic pyrolysis (Benchmark Comparison) |
|---|---|---|---|---|---|
| | | | Scale | | |
| | 10 tons/day | 100 tons/day | 250 tons/day | 300 tons/day | 300 tons/day |
| Capital cost (million $) | 3.3 | 13.1 | 22.7 | 25.3 | 140 (Construction), 260 |
| Depreciation year | 10 | 10 | 10 | 10 | 10 |
| (1) Capital cost/ton of feed | 110 | 43.7 | 30.3 | 28.1 | 156 |
| (2) Operating cost/ton of feed[2] | (9 employees $77,000) 231 | (50 employees, $77,000) 128 | (140 employees, $77,000) 120 | (140 employees, $77,000) 120 | (140 employees, $77,000) 120 |
| (3) Feedstock cost/ton of feed[3] | 70 | 70 | 70 | 70 | 70 |
| (4) Utility cost/ton of feed | 23.4 | 23.4 | 23.4 | 23.4 | 23.4 |
| (5) = (1) + (2) + (3) + (4) Total cost/ton of feed | 434 | 265 | 244 | 242 | 370 |
| (6) Revenue/ton of feed | 450 | 450 | 450 | 450 | 425 |
| (7) = (6) − (5) Profit/ton of feed | 16 | 185 | 206 | 208 | 55 |
| Payback year | >20 | 2.4 | 1.5 | 1.4 | 7-14 |

Potential Impacts

Through the operation of ITCS units, especially that utilizing HTP and multi-stage condensation to perform integrated thermal conversion and separation, respectively, this robust technology has the potential of annually saving 244 million tons of polyolefin and polystyrene waste. This potential will continue to increase as the rate of plastic production grows with each new year. Through the recovery of these plastic wastes, it is estimated that up to 210 million tons of fuels can be recovered annually through ITCS operation, which equates to the energy savings of 1.5 billion barrels of crude oil every year. ITCS also can reduce the GHG emissions by 100 million tons of $CO_2$ annually for producing 1.5 billion barrels of fuels. This technology even has the potential to recover other products such as jet fuels, heavy oils, lubricants, waxes, and naphtha oils. Specifically, these naphtha oils have the potential of being recovered for monomers that can be used to repolymerize new plastics, which can lead to the formation of a circular economy of monomers for plastics. These benefits and impacts of ITCS have the potential of not only revitalizing and expanding the recycling industry, but also reducing the accumulation of plastic waste in the environment, which will help reduce the environmental damage caused by the accumulation of these plastics.

Figure 27A:
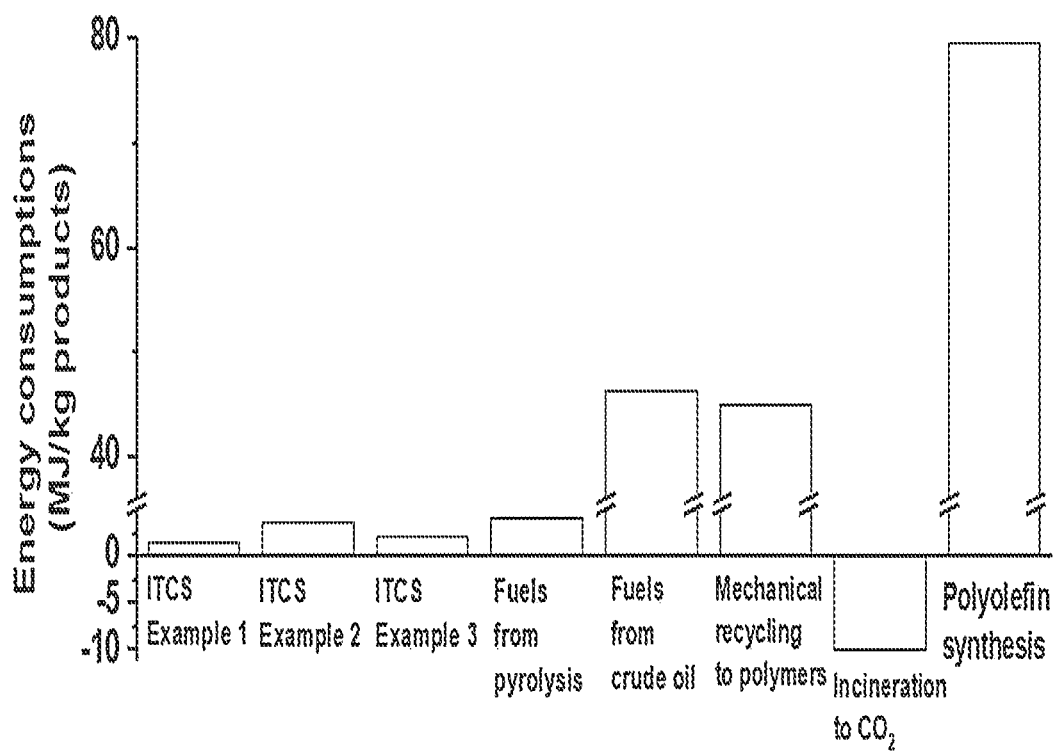
FIG. 27A graphically illustrates estimated energy consumption of ITCS (Example 1-3), conventional pyrolysis, producing fuels from crude oil, mechanical recycling, incineration, and polyolefin synthesis.
Figure 27B:
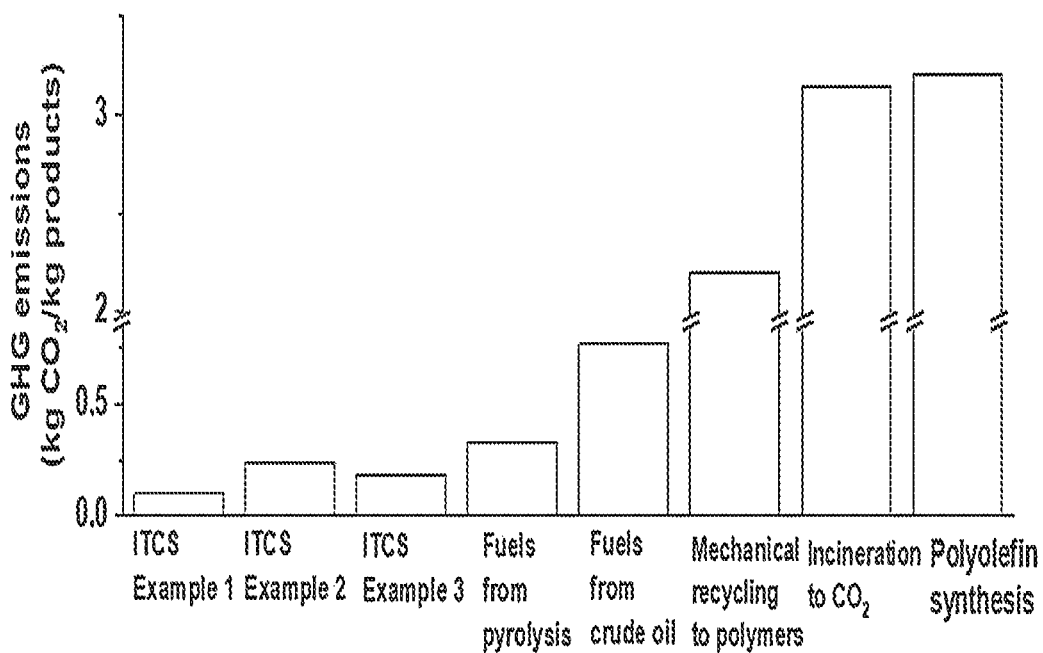
FIG. 27B graphically illustrates estimated GHG emissions of ITCS (Example 1-3), conventional pyrolysis, producing fuels from crude oil, mechanical recycling, incineration, and polyolefin synthesis.

When considering the energy consumption and greenhouse gas emissions from the operation of these ITCS methods, comparisons between these methods and conventional fuel production methods can be made to showcase the relative advantages of ITCS, especially through the operation of HTP coupled with multi-stage condensation (Example 1). Through these comparisons, one can see how ITCS, which is performed through HTP coupled with multi-stage condensation (Example 1), HTP coupled with distillation (Example 2), or pyrolysis coupled with multi-stage condensation (Example 3), has the potential to require no energy input and reducing greenhouse gas emissions in terms of kilograms of $CO_2$ emitted per kilogram of feedstock by up to 87% compared to those emitted during the production of fuels from crude oil (FIGS. 27A-B). Additionally, when considering the possibility of combusting light hydrocarbon vapor produced through ITCS, it is suggested that ITCS can actually be performed at rates of energy return. Through these comparative calculations, the potentials of ITCS to be a technology that can not only save energy but also reduce environmental impacts are strengthened.

Following these discussed points, the impacts, advantages, and benefits of integrated thermal conversion and separation (ITCS) for the treatment of plastic waste to produce transportation fuels can be summarized. Through optimization, low-pressure hydrothermal processing (HTP), at preferred operation conditions of 400-500° C., 0.1-10 MPa, and 30-240 minutes, can be utilized to continuously convert polyolefin and polystyrene waste into hydrocarbon mixtures with high oil yields (up to 87%) and a narrow carbon number range (mostly $C_1$ to $C_{25}$). The optimization of these reaction conditions allows for easier separation, and integration utilizes these optimized reaction conditions to optimize separation conditions and minimize required energy usage. Multi-staged condensation can then be employed to separate these oils produced from either HTP or pyrolysis into gasoline ($C_4$-$C_{12}$) and diesel ($C_8$-$C_{25}$) fractions while significantly improving energy savings compared to the use of distillation. These integrated conversion and separation processes can produce higher-quality gasoline and diesel products from feedstocks with synergistic combinations of PE, PP, and PS waste that have been shown to result in enhanced fuel properties. Preliminary techno-economic analysis studies indicate that ITCS can be economical at scales of at least 100 tons per day. Additionally, energy analysis studies indicate that ITCS operation to produce fuels can save all the energy required for producing the same quantity of fuels from crude oil, and can even result in a net energy gain through the combustion of recovered light hydrocarbon gases ($C_1$-$C_3$) for energy. Finally, ITCS operation to produce fuels can reduce GHG emissions by up to 87% compared to fuel production from crude oil. Through the use of this productive, energy-efficient, environmentally friendly, and economical process, ITCS can help reduce the accumulation of plastic waste in the surrounding environment and can help reduce the damage caused by plastic waste pollution.

Piping and Instrumentation Diagram (P&ID)

Figure 28:
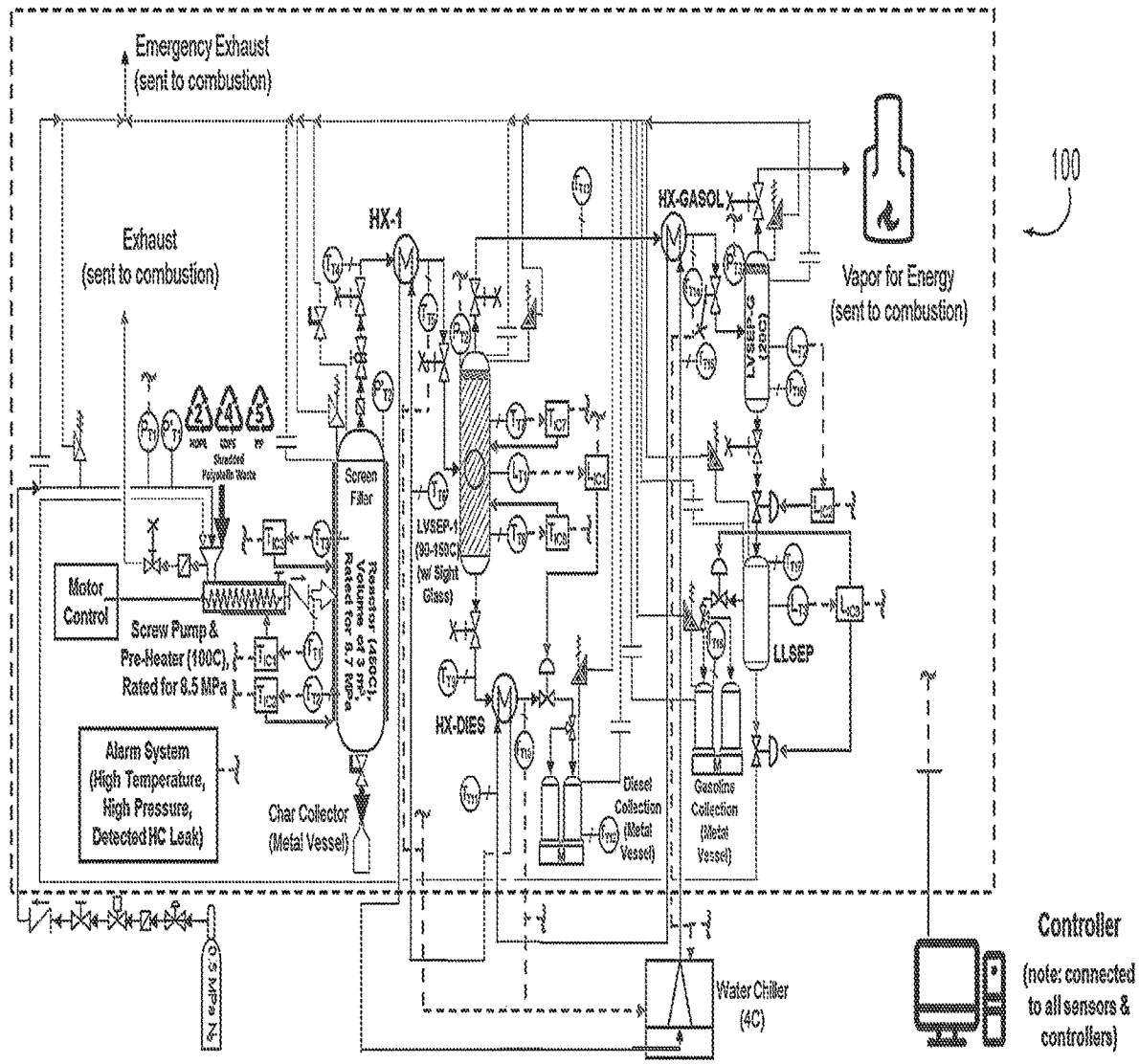
FIG. 28 graphically illustrates piping and instrumentation diagram (P&ID) for Example 1 of ITCS, utilizing HTP for conversion and multi-stage condensation for separation.

In order to understand the operation of the ITCS assembly 100 utilizing HTP and multi-stage condensation, an example of a piping and instrumentation diagram (P&ID) was generated (FIG. 28). If an operating pressure for the reactor 105 is desired to be above atmospheric pressure, a nitrogen tank is employed to pressurize the screw pump 115 and reactor 105. Proper pressure regulation and safety checks, such as pressure relief valves, rupture disks, and pressure regulation valves, are employed in this feed system and throughout the entire setup. After the plastic waste (shredded in shredder 110) and process water are combined in a feed tank 113 and fed into the screw pump 115 and pre-heated via a heater 120, the plastic waste is fed into the reactor 105. Thermocouples 125 and/or pressure sensors 127 are utilized in this reactor 105 and throughout the system 100 to aid in the regulation of temperatures and pressures at desired values by acting as transmitters to an electronic controller 130 that controls heating elements 120, 135 throughout the system 100. The hot vapor then exits the reactor 105, typically through a filter 140, according to the desired residence time while any remaining solids remain in the reactor 105 and are collected, such as following shutdown of the system 100. Before the partial cooling of the hot products in HX-1 145 to the desired separation temperature, a back pressure regulator is typically employed to ensure that the pressure of the separation units is maintained at the desired (such as atmospheric) pressure. Using level control and temperature control to maintain liquid-vapor equilibrium within LVSEP-1 150, which typically has a built-in sight glass, the diesel and gasoline fractions are separated and then subsequently cooled in the downstream heat exchangers 155, 160 (HX-DIES 155 and HX-GASOL 160, respectively). Following separation of the gasoline fraction and light hydrocarbon vapor in LVSEP-G 165, which also utilizes a level control system, the vapor is collected in collector 175 and/or routed to a furnace or a generator for energy return, and the gasoline fraction is separated from the process water and collected. In order to ensure safety when operating this system 100, alarms are utilized to monitor for the presence of hydrocarbon leaks and excessively high temperatures and pressures throughout the system, which are used to aid in the activation of automatic shutdown procedures. Shut-off valves are included throughout the setup to shutdown units in the system 100 as necessary, and safety lines are put in place to send any streams redirected in emergencies to an emergency exhaust. A computer 130 is used to ensure that the system 100 and its operating conditions can be easily monitored, controlled, and shutdown as needed (FIG. 28).

Detailed PFD and Equipment Sizing of ITCS Example 1 at the Scale of 10 Tons/Day.

Figure 29:
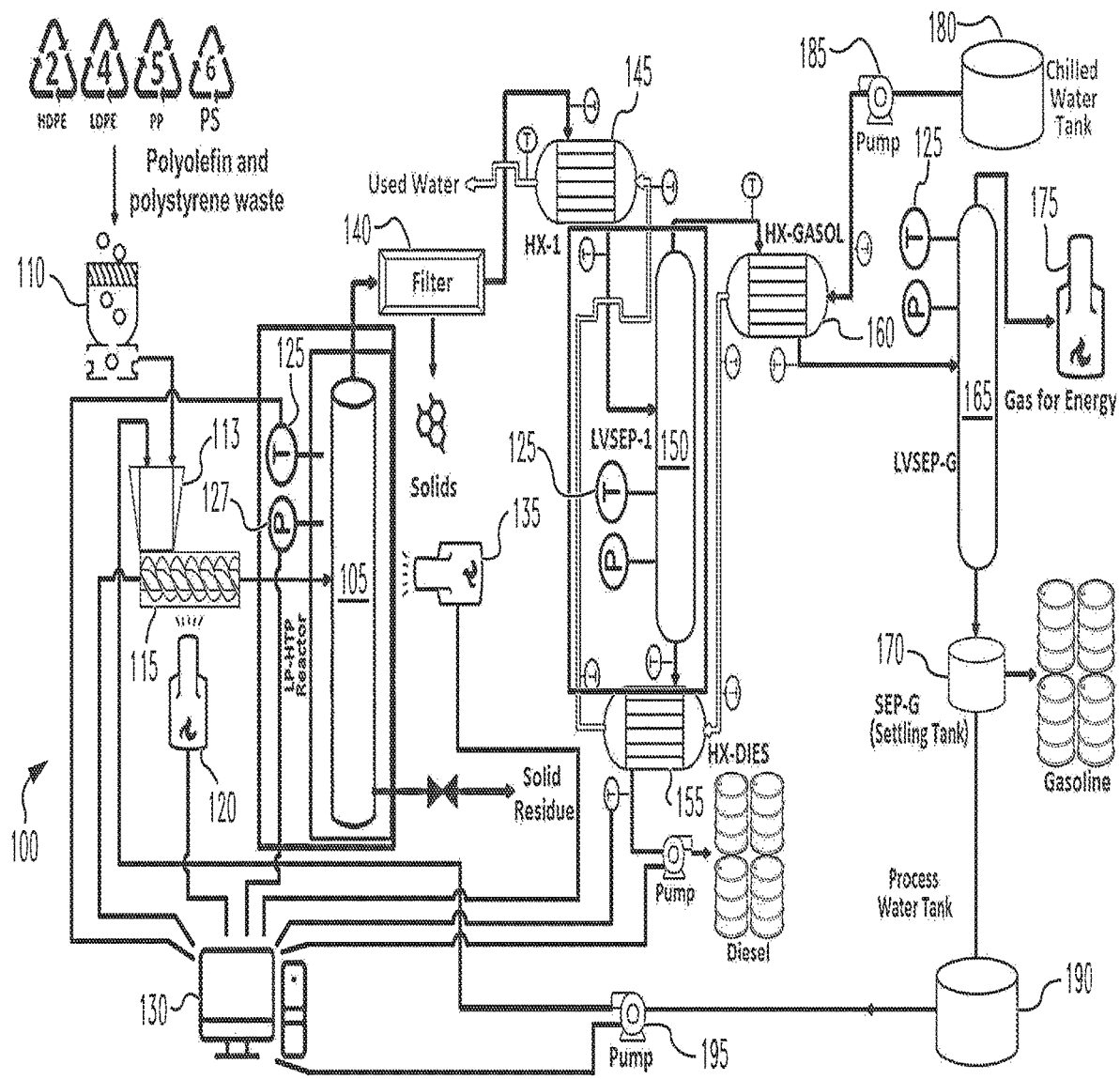
FIG. 29 is a process flow diagram of a pilot-scale ITCS setup utilizing HTP and multi-stage condensation to treat 10 tons of plastic waste per day.

For the operation of the pilot-scale ITCS system 100 utilizing HTP for its reaction unit and multi-stage condensation for its separation unit, the process flow diagram, FIG. 29, is meant to illustrate the conversion of plastic waste at a rate of 10 tons per day to gasoline and diesel fractions, while also recovering light hydrocarbon vapor for use in energy return. Following the size-reduction of plastic waste via shredder 110, the waste is fed with any additionally needed process water (pumped via pump 195 from water source 190) into a feed tank 113 that leads into a screw pump 115, which moves the feed into the reactor 105 at a feed rate of 10 tons of plastic waste per day. This screw pump 115 is heated via heater 120 *n* thermal communication therewith to reduce the energy and time needed for the heat up in the reactor 105. Following the desired residence time within the reactor 105, the hot vapor products exit the reactor 105 while any remaining solid char remains at the bottom of the reactor or is filtered out. The reactor 105 is in fluidic communication with first condenser or heat exchanger 145. The hot vapor product stream is sent through the first heat exchanger (HX-1) 145, which cools the product stream to the desired optimum temperature for separation into gasoline and diesel fractions. This separation occurs in the subsequent liquid-vapor separator (LVSEP-1) 150 in fluidic communication with HX-1 145, and operates at a temperature ranging from 75 to 200° C. to separate the reaction product stream into the two fuel fractions. The heavier hydrocarbons, such as those ranging mostly from $C_8$ to $C_{25}$, exit LVSEP-1 as a liquid and are cooled in a heat exchanger (HX-DIES) 155 in fluidic communication with LVSEP-1 150 to room temperature. A settling tank is employed to remove any trace water, and then these heavier hydrocarbons are collected as the diesel fraction (mostly $C_8$-$C_{25}$).

Additionally, the lighter hydrocarbons, such as those ranging mostly from $C_1$-$C_{12}$, exit LVSEP-1 150 as a vapor and are also cooled in a heat exchanger (HX-GASOL) 160 fluidically connected to LVSEP-1 150 to room temperature. The cooling of all hot streams that pass through heat exchangers 145, 155, 160 in this system 100, which all specifically pass through the shell sides of the heat exchangers shown, is achieved using a single chilled water stream (originally 4° C.) originating at chilled water source 180 and fluidically connected pump 185, passing through the tube sides of the heat exchangers 145, 155, 160. Any used water is sent back to the chilled water tank 180 to be chilled again to 4° C., which will help reduce water usage. Following this cooling step, a second liquid-vapor separator (LVSEP-G) 165 connected in fluidic communication with HX-GASOL 160 is used to separate the light hydrocarbon vapor (mostly $C_1$-$C_3$) from the gasoline fraction (mostly $C_4$-$C_{12}$), and a settling tank 170 fluidically connected thereto is employed to remove process water that can be reused. Some of this light hydrocarbon vapor is then combusted in furnace 135 to power the HTP reactor and/or heater 120 to heat the feed, and the remainder maty be combusted in a generator to power the chilling unit and any pumps within the system, as well as to provide an energy return (FIG. 29). If heavy oil removal is desired, an additional liquid-vapor separator unit (not shown) may be added in between the reactor and LVSEP-1.

TABLE 14

Recommended Designs of Equipment for ITCS using HTP and Multi-Stage Condensation at 10 tons/day scale

| Equipment | Length (m) | Diameter/ Width (m) | Volume ($m^3$) or Surface Area ($m^2$) | Notes |
|---|---|---|---|---|
| Reactor | 4.57 (15 ft.) | 0.91 (3 ft.) | ~3 $m^3$ | Based on five times fill volume of feed (45 minutes, 312.5 kg), and L/D = 5 |
| Heat Exchangers (4 Total: 1 HX-1, 2 HX-GASOL, 1 HX-DIES) | 1.02 | 0.28 | ~5.0 $m^2$ each | Stainless Steel 316, Shell-and-Tube |
| LVSEP-1 (& LVSEP-G) | 0.85 | 0.17 | $1.93 \times 10^{-2}$ $m^3$ | Based on L/D = 5 |

When constructing a pilot-scale setup (10 tons/day) for this version of ITCS, the following sizes of major equipment units were used. Specifically for the reactor, a volume equating to roughly five times the volume of the feed entering the reactor over a period of 45 minutes (312.5 kg of plastic waste) is recommended, with a length-to-diameter ratio of 5-to-1. For the heat exchanger units, surface areas for HX-1 and HX-DIES are roughly 5 $m^2$ while the surface area of HX-GASOL is roughly 10 $m^2$. Therefore, one could utilize four 5 $m^2$ heat exchangers in order to satisfy equipment requirements for every heat exchanger unit in this system (while making sure to use two of these heat exchangers for HX-GASOL). Finally, based on design calculations for the minimum dimensions required for the liquid-vapor separator unit, the following design parameters were determined while also utilizing a length-to-diameter ratio of 5-to-1 (Table 14).

While the disclosure has been illustrated and described in detail in the figures and foregoing description, the same is to be considered as illustrative and not restrictive in character, it being understood that only selected embodiments have been shown and described, and that all changes, modifications and equivalents that come within the spirit of the disclosures described heretofore and/or defined by the following claims are desired to be protected, including any of nigh-infinite variations, uses, or adaptations that follow the general principles herein, and such departures as come within known or customary practice within the art to which the present disclosure pertains. In addition, all publications cited herein are indicative of the level of skill in the art, and are hereby incorporated by reference in their entirety as if each bad been individually incorporated by reference and fully set forth.

We claim:

1. An integrated thermal conversion and separation system comprising:
    a reactor vessel having an inlet and an outlet;
    a filter for preventing solids from passing through the outlet;
    a first condenser connected in fluidic communication with the reactor vessel for condensing oil;
    a first separation vessel connected in fluidic communication with the first condenser for separating the oil into at least a gasoline fraction and a diesel fraction;
    a second condenser connected in fluidic communication with the first separation vessel for receiving and further condensing the diesel fraction into diesel oil;
    a third condenser connected in fluidic communication with the first separation vessel for receiving and further condensing the gasoline fraction;
    a second separation vessel connected in fluidic communication with the third condenser for receiving condensed gasoline fraction and separating the gasoline fraction into vapor and gasoline;
    a vapor collection vessel connected in fluidic communication with the second separation vessel;
    a gasoline separation tank connected in fluidic communication with the second separation vessel for collecting gasoline;
    a chilled water source operationally connected to the respective condensers;
    a water source operationally connected to the reactor vessel; and
    a furnace connected in thermal communication with the reactor vessel.

2. The system of claim 1 wherein the respective separation units are distillation columns.

3. The system of claim 1 wherein the respective separation units are multi-stage condensers.

4. The system of claim 1 and further comprising:
    a shredder for receiving polyolefin and polystyrene waste and yielding shredded polyolefin/polystyrene waste;
    a feed tank operationally connected to the shredder and to the water source for receiving and combining water and shredded polyolefin/polystyrene waste to yield feed;
    a screw pump operationally connected to the feed tank for receiving, mixing, and pumping feed into the inlet; and
    a heater connected in thermal communication with the screw pump.

5. The system of claim 1 and further comprising:
    a solid residue port formed in the reactor vessel for extracting solid residue therefrom.

6. The system of claim 1 and further comprising a water pump operationally connected to the water source; a chilled water pump operationally connected to the chilled water source; an electronic controller operationally connected to the screw pump, the water pump, and the chilled water pump; and a plurality of pressure and temperature sensors connected in electric communication with the electronic controller; wherein a respective temperature sensor and a respective pressure sensor is operationally connected to each respective condenser and to each respective separation vessel.

7. The system of claim 1 wherein the heater and the furnace are fueled by vapors routed from the vapor collection vessel.

8. A method of producing useful fuel fluids from solid plastic waste, comprising:
   a) loading solid plastic waste matter into a reaction chamber to define a load;
   b) subjecting the load to HTP to extract hydrocarbon mixtures;
   c) filtering the hydrocarbon mixtures to extract solid matter;
   d) separating the hydrocarbon mixtures into a light fraction ($C_1$ to $C_{25}$) and a heavy fraction ($C_{26}$ to $C_{31}$);
   e) directing the heavy fraction to a first container and the light fraction to a second container;
   f) separating the light fraction into diesel ($C_8$-$C_{25}$), gasoline ($C_4$-$C_{12}$), and vapor ($C_1$-$C_5$);
   g) directing the diesel to a third container;
   h) directing the gasoline to a fourth container;
   i) directing the vapor to a fifth container;
   wherein the hydrocarbon mixtures have a carbon number distribution between $C_1$ and $C_{31}$;
   wherein the pressure in the reaction chamber is between 0.1 and 23 MPa;
   wherein the plastic waste is selected from the group consisting of PS, PE, PP, and mixtures thereof,
   wherein the temperature in the reaction chamber is between 200 and 600 degrees Celsius.

9. The method of claim 8 wherein the load has a water to plastic weight ratio no more than 2:1; and wherein the reaction time is less than 6 hours.

10. The method of claim 8 wherein steps d) and f) are accomplished by distillation.

11. The method of claim 8 wherein steps d) and f) are accomplished by condensation.

12. The method of claim 11 wherein gasoline ($C_8$) and naphtha are separated from diesel ($C_{11-12}$) at 75° C.-155° C.; wherein jet-fuel B ($C_{9-11}$) is separated from jet-fuel A ($C_{10-12}$) at 75° C.-175° C.; and wherein Jet-fuel A is separated from lubricating oil at 100° C.-300° C.

13. The method of claim 8 and further comprising:
   j) using the vapor to power the reactor.

14. The method of claim 8 wherein the second container is a distillation column.

15. The method of claim 8 wherein the second container is a series of condensers connected in fluidic communication.

* * * * *